US012567327B2

(12) United States Patent
Ujiie

(10) Patent No.: US 12,567,327 B2
(45) Date of Patent: Mar. 3, 2026

(54) TRAVEL DETERMINATION METHOD AND TRAVEL DETERMINATION SYSTEM

(71) Applicant: Panasonic Intellectual Property Corporation of America, Torrance, CA (US)

(72) Inventor: Yoshihiro Ujiie, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 80 days.

(21) Appl. No.: 18/428,888

(22) Filed: Jan. 31, 2024

(65) Prior Publication Data

US 2024/0177603 A1 May 30, 2024

Related U.S. Application Data

(63) Continuation of application No. PCT/JP2022/026301, filed on Jun. 30, 2022.

(Continued)

(30) Foreign Application Priority Data

Mar. 4, 2022 (JP) ................................ 2022-033640

(51) Int. Cl.

*G08G 1/0968* (2006.01)
*G08G 1/01* (2006.01)

(52) U.S. Cl.

CPC ......... *G08G 1/0968* (2013.01); *G08G 1/0145* (2013.01)

(58) Field of Classification Search

CPC .......... G08G 1/00; G08G 1/09; G08G 1/0968; G08G 1/0145; G08G 1/095; G08G 1/16;

(Continued)

(56) References Cited

U.S. PATENT DOCUMENTS 10,304,339 B2 * 5/2019 Jiang ................. B60W 50/0098
11,252,638 B2 * 2/2022 Zavesky ............... H04W 48/04

(Continued)

FOREIGN PATENT DOCUMENTS

JP 2017-122990 7/2017
JP 2019-153149 9/2019

(Continued)

OTHER PUBLICATIONS

International Search Report issued in International Pat. Appl. No. PCT/JP2022/026301, dated Sep. 13, 2022, along with an English language translation thereof.

(Continued)

*Primary Examiner* — Andrew Joseph Rudy
(74) *Attorney, Agent, or Firm* — GREENBLUM & BERNSTEIN, P.L.C.

(57) ABSTRACT

A first vehicle is an unmanned ground vehicle and holds a first digital certificate according to at least one of a vehicle purpose of the first vehicle and a service of the first vehicle, and a second vehicle holds a second digital certificate according to at least one of a vehicle purpose of the second vehicle and a service of the second vehicle. A travel determination method includes obtaining the first digital certificate and the second digital certificate, and determining whether to prioritize travel of the first vehicle or the second vehicle, based on the first digital certificate and the second digital certificate obtained, when each of the first vehicle and the second vehicle travels on a corresponding transport route.

20 Claims, 25 Drawing Sheets

Related U.S. Application Data

(60) Provisional application No. 63/230,321, filed on Aug. 6, 2021.

(58) Field of Classification Search
CPC ......... G08G 61/00; H04L 29/00; H04W 4/00; G16Y 10/40; G06Q 10/047
USPC .......................................................... 701/117
See application file for complete search history.

(56) References Cited

U.S. PATENT DOCUMENTS

| | | | | |
|---|---|---|---|---|
| 11,640,675 | B2 * | 5/2023 | Guo | G06V 10/82 701/117 |
| 11,878,643 | B2 * | 1/2024 | Kumar | G07C 5/008 |
| 12,101,702 | B2 * | 9/2024 | Moisio | G08G 1/0112 |
| 2017/0192438 | A1 | 7/2017 | Morimoto et al. | |
| 2017/0311228 | A1 * | 10/2017 | Zavesky | H04W 4/029 |
| 2019/0385448 | A1 | 12/2019 | Montemurro et al. | |
| 2021/0300436 | A1 | 9/2021 | Kondo et al. | |
| 2022/0396229 | A1 * | 12/2022 | Kumar | G08G 1/162 |

FOREIGN PATENT DOCUMENTS

| | | | |
|---|---|---|---|
| JP | 2021-160849 | | 10/2021 |
| WO | 2018/026807 | A1 | 2/2018 |

OTHER PUBLICATIONS

Supplementary European Search Report for App. No. EP 22 85 2752, dated Oct. 31, 2024.

* cited by examiner

FIG. 4

| Priority | Vehicle purpose/service |
|---|---|
| S | Emergency/emergency vehicle |
| A | Food delivery/urgent |
| B | Normal/urgent |
| C | Food delivery |
| D | Normal |

TRAVEL DETERMINATION METHOD AND TRAVEL DETERMINATION SYSTEM

CROSS REFERENCE TO RELATED APPLICATIONS

This is a continuation application of PCT International Application No. PCT/JP2022/026301 filed on Jun. 30, 2022, designating the United States of America, which is based on and claims priority of U.S. Provisional Patent Application No. 63/230,321 filed on Aug. 6, 2021, and Japanese Patent Application No. 2022-033640 filed on Mar. 4, 2022. The entire disclosures of the above-identified applications, including the specifications, drawings and claims are incorporated herein by reference in their entirety.

FIELD

The present disclosure relates to a travel determination system and a travel determination method for making a determination pertaining to travel of a first vehicle and a second vehicle each transporting an object to a location that is set.

BACKGROUND

In recent years, mobile entities such as autonomous mobile robots are being used in daily life. For example, with increases in the distribution of goods, services in which autonomous mobile robots deliver products (an example of an "object") and the like are being considered. PTL 1 discloses a technique for delivering cargo using a cargo transport vehicle that travels autonomously and includes cargo storage.

CITATION LIST

Patent Literature

PTL 1: Japanese Unexamined Patent Application Publication No. 2021-160849

SUMMARY

Technical Problem

Incidentally, if a plurality of vehicles that provide such services for delivering products are present, it is desirable for each of the plurality of vehicles to travel appropriately according to, for example, the details of the service provided by each of the plurality of vehicle.

Accordingly, the present disclosure provides a determination method and a determination system through which a plurality of vehicles can travel appropriately.

Solution to Problem

A travel determination method according to one aspect of the present disclosure is a travel determination method of making a determination pertaining to travel of a first vehicle and a second vehicle each transporting an object to a set location. The first vehicle is an unmanned ground vehicle, and holds a first digital certificate according to at least one of a vehicle purpose of the first vehicle or a service of the first vehicle. The second vehicle holds a second digital certificate according to at least one of a vehicle purpose of the second vehicle or a service of the second vehicle. The travel determination method includes: obtaining the first digital certificate and the second digital certificate; and first determining of determining whether to prioritize travel of the first vehicle or the second vehicle, based on the first digital certificate and the second digital certificate obtained, when each of the first vehicle and the second vehicle travels on a corresponding transport route.

A travel determination system according to one aspect of the present disclosure is a travel determination system that makes a determination pertaining to travel of a first vehicle and a second vehicle each transporting an object to a set location. The first vehicle is an unmanned ground vehicle, and holds a first digital certificate according to at least one of a vehicle purpose of the first vehicle or a service of the first vehicle. The second vehicle holds a second digital certificate according to at least one of a vehicle purpose of the second vehicle or a service of the second vehicle. The travel determination system includes: an obtainer that obtains the first digital certificate and the second digital certificate; and a determiner that determines whether to prioritize travel of the first vehicle or the second vehicle, based on the first digital certificate and the second digital certificate obtained, when each of the first vehicle and the second vehicle travels on a corresponding transport route.

Advantageous Effects of Invention

According to one aspect of the present disclosure, a travel determination method and the like through which a plurality of vehicles can travel appropriately can be realized.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram illustrating an example of a determination table according to Embodiment 1.

DESCRIPTION OF EMBODIMENTS

Circumstances Leading to the Present Disclosure

Figure 1:
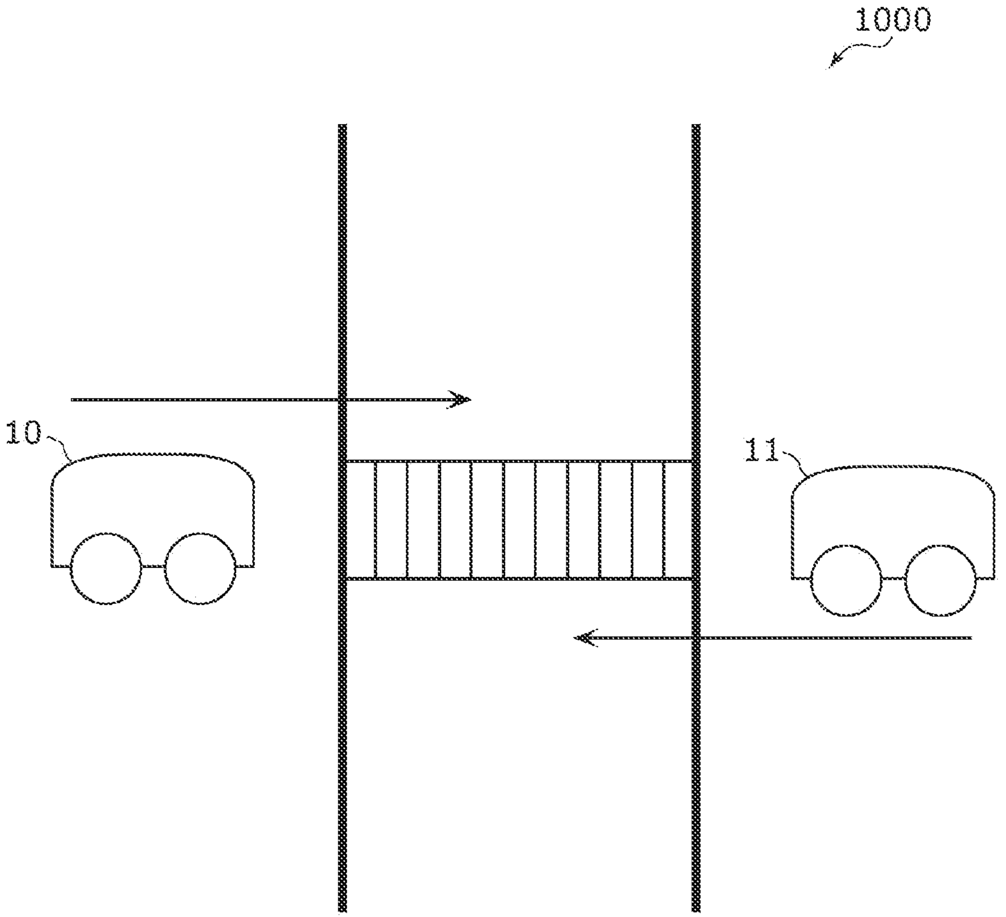
FIG. 1 is a diagram illustrating an example of the overall configuration of a transport system according to Embodiment 1.

There are situations where the delivery routes (an example of a "transport route") partially overlap for two vehicles providing delivery services. Delivery routes "partially overlapping" includes the delivery routes intersecting, as well as the routes passing through the same segment (e.g., a crosswalk or a road too narrow for the vehicles to pass by each other). In such cases, it is necessary to prioritize the travel of one of the two vehicles.

Here, products delivered by vehicles (an example of an "object") include products that need to be delivered quickly, and products that do not need to be delivered quickly. Likewise, services provided by vehicles (e.g., delivery services) include services that need to be provided quickly, and services that do not need to be provided quickly.

When one or both of the two vehicles is an autonomous mobile robot, and the two vehicles meet, which of the vehicles is to travel with priority is determined. At this time, it is desirable to make the determination in accordance with the objects delivered by the vehicles or the services provided by the vehicles. For example, it is desirable to prioritize the travel of vehicles delivering products that need to be delivered quickly over that of vehicles delivering products that do not need to be delivered quickly. It is also desirable that the determination as to which vehicle is to travel with priority be made appropriately (e.g., fairly).

Accordingly, the inventors of the present application diligently studied travel determination methods and travel determination systems which enable a plurality of vehicles to travel appropriately, i.e., travel determination methods and travel determination systems capable of appropriately determining which of vehicles is to travel with priority, and devised the travel determination method and the travel determination system described hereinafter.

A travel determination method according to one aspect of the present disclosure is a travel determination method of making a determination pertaining to travel of a first vehicle and a second vehicle each transporting an object to a set location. The first vehicle is an unmanned ground vehicle, and holds a first digital certificate according to at least one of a vehicle purpose of the first vehicle or a service of the first vehicle. The second vehicle holds a second digital certificate according to at least one of a vehicle purpose of the second vehicle or a service of the second vehicle. The travel determination method includes: obtaining the first digital certificate and the second digital certificate; and first determining of determining whether to prioritize travel of the first vehicle or the second vehicle, based on the first digital certificate and the second digital certificate obtained, when each of the first vehicle and the second vehicle travels on a corresponding transport route.

This makes it possible to determine whether to prioritize travel of the first vehicle or the second vehicle, based on at least one of the vehicle purposes of and the services provided by the first vehicle and the second vehicle. Additionally, because digital certificates are used for the determination, situations where the determination result is manipulated improperly can be suppressed. As such, according to the travel determination method, the determination pertaining to the travel made based in at least one of the vehicle purposes of and the services provided by the vehicles is made based on the digital certificates, and a plurality of vehicles can therefore travel appropriately.

Additionally, for example, the first determining may include determining whether to prioritize travel of the first vehicle or the second vehicle on the overlapping part, based on the first digital certificate and the second digital certificate, when the transport route of the first vehicle and the transport route of the second vehicle have an overlapping part.

This makes it possible to determine whether to prioritize travel of the first vehicle or the second vehicle on parts of the transport routes that overlap. As such, according to the travel determination method, when the first vehicle and the second vehicle meet at the overlapping part of the transport route, the first vehicle and the second vehicle which have met can travel appropriately.

Additionally, for example, the first determining may include: determining a first priority with which the first vehicle is to travel on the overlapping part based on the first digital certificate; determining a second priority with which the second vehicle is to travel on the overlapping part, based on the second digital certificate; and determining whether to prioritize travel of the first vehicle or the second vehicle based on the first priority and the second priority determined.

This makes it possible to make the determination pertaining to the travel using the priority.

Additionally, for example, the travel determination method may further include second determining of determining whether the first vehicle and the second vehicle are near each other in a periphery of the overlapping part, and the obtaining and the first determining may be executed when the first vehicle and the second vehicle are determined to be near each other in the second determining.

This makes it possible to make the determination pertaining to the travel on the parts of the transport routes that overlap when the first vehicle and the second vehicle are near each other. In other words, if the first vehicle and the second vehicle do not meet at the parts of the transport routes that overlap, the determination pertaining to the travel is not made. Accordingly, situations in which the determination processing is performed unnecessarily can be suppressed.

Additionally, for example, the first digital certificate may be issued for each of types of the vehicle purpose of the first vehicle, and the second digital certificate may be issued for each of types of the vehicle purpose of the second vehicle.

This makes it possible to determine whether to prioritize travel of the first vehicle or the second vehicle, based on the types of the vehicle purposes of the first vehicle and the second vehicle.

Additionally, for example, the types of the vehicle purpose may include an emergency vehicle.

This makes it possible for a plurality of vehicles to travel appropriately according to whether the vehicles are emergency vehicles.

Additionally, for example, the first digital certificate may be issued for each of types of the service provided by the first vehicle, and the second digital certificate is issued for each of types of the service provided by the second vehicle.

This makes it possible to determine whether to prioritize travel of the first vehicle or the second vehicle, based on the types of the services provided by the first vehicle and the second vehicle.

Additionally, for example, the types of the service may include a service that has a validity period.

This makes it possible to determine whether to prioritize travel of the first vehicle or the second vehicle, based on the validity periods of the services provided by the first vehicle and the second vehicle.

Additionally, for example, the validity period of the service may be a validity period based on a delivery time of the service.

This makes it possible to determine whether to prioritize travel of the first vehicle or the second vehicle, based on the validity periods that are based on the delivery times of the services.

Additionally, for example, the object may include a food and/or beverage product, and the delivery time may be a time based on a permissible delivery time of the food and/or beverage product.

This makes it possible to determine whether to prioritize travel of the first vehicle or the second vehicle, based on the permissible delivery time for the food and/or beverage product.

Additionally, for example, the first digital certificate may be issued when the first vehicle is manufactured and is held in advance in the first vehicle.

This eliminates the need for the users of the vehicles or the like to store the digital certificates, which improves the convenience of the first vehicle and the second vehicle.

Additionally, for example, the first digital certificate according to the first service may be transmitted to the first vehicle from a server to which the first vehicle can communicably connect when the first vehicle is authorized to provide a first service.

Through this, even when a new service for a vehicle is authorized, the determination pertaining to the travel in accordance with the new service can be made appropriately.

Additionally, for example, the first digital certificate may be revoked when authorization to provide a service corresponding to the first digital certificate is canceled, and the second digital certificate may be revoked when authorization to provide a service corresponding to the second digital certificate is canceled.

This makes it possible to suppress situations where the first determining cannot be performed accurately due to the use of an improper public key certificate, e.g., for which the validity period has passed, there is a risk of information being leaked, or the like.

Additionally, for example, the first vehicle may hold two or more digital certificates including the first digital certificate corresponding to the first service and a third digital certificate corresponding to a second service, and the travel determination method may further include switching a digital certificate used in the first determining from one of the first digital certificate or the third digital certificate to the other in response to switching from one of the first service and the second service to the other.

Through this, when the service is switched in the first vehicle, the digital certificate used for the determination is automatically switched, which further improves the convenience of the travel determination method.

Additionally, for example, a start of delivery of the first service may be a first timing at which the object is placed in the first vehicle, an end of the first service may be a second timing at which the object is unloaded from the first vehicle, and the switching may include switching from one of the first digital certificate and the third digital certificate to the other at the first timing or the second timing.

This makes it possible to switch the digital certificate at the second timing, which is when the cargo is unloaded.

Additionally, for example, the first vehicle may be slowed down or temporarily stopped when it is determined to prioritize travel of the second vehicle as a result of the first determining.

This makes it possible to allow the second vehicle to travel safely.

Additionally, for example, the first determining may be executed by an external device outside the first vehicle and the second vehicle, and the first vehicle may receive an instruction to slow down or temporarily stop from the external device, when it is determined to prioritize travel of the second vehicle priority as a result of the first determining.

This makes it possible to allow the second vehicle to travel safely based on instructions received from an external device.

Additionally, for example, the travel determination method may further include presenting a result of the first determining to a monitoring party that remotely monitors a transport system including the first vehicle and the second vehicle.

This makes it possible to present a determination result or the like to the user.

A travel determination system according to one aspect of the present disclosure is a travel determination system that makes a determination pertaining to travel of a first vehicle and a second vehicle each transporting an object to a set location. The first vehicle is an unmanned ground vehicle, and holds a first digital certificate according to at least one of a vehicle purpose of the first vehicle or a service of the first vehicle. The second vehicle holds a second digital certificate according to at least one of a vehicle purpose of the second vehicle or a service of the second vehicle. The travel determination system includes: an obtainer that obtains the first digital certificate and the second digital certificate; and a determiner that determines whether to prioritize travel of the first vehicle or the second vehicle, based on the first digital certificate and the second digital certificate obtained, when each of the first vehicle and the second vehicle travels on a corresponding transport route.

This provides the same effects as those of the above-described travel determination method.

Additionally, for example, the travel determination system may further include a display that displays a determination result in the determiner on a screen.

This makes it possible for the display to present a determination result or the like to the user.

Note that these comprehensive or specific aspects may be realized by a system, a method, an integrated circuit, a computer program, or a non-transitory computer-readable recording medium such as a CD-ROM, or may be implemented by any desired combination of systems, devices, methods, integrated circuits, computer programs, and recording media. The program may be stored in advance in a recording medium, or may be supplied to the recording medium via a wide-area communication network including the Internet.

Embodiments will be described in detail hereinafter with reference to the drawings.

Note that the following embodiments describe comprehensive or specific examples of the present disclosure. The numerical values, shapes, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims will be described as optional constituent elements.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, terms indicating relationships between elements, such as "the same", numerical values, and numerical value ranges do not express the items in question in the strictest sense, and also include substantially equivalent ranges, e.g., differences of approximately several percent (e.g., approximately 10%), as well.

Embodiment 1

A transport system in which a travel determination method according to the present embodiment is used will be described hereinafter with reference to FIGS. 1 to 7.

1-1. Configuration of Transport System

First, the configuration of the transport system according to the present embodiment will be described with reference to FIGS. 1 to 4. FIG. 1 is a diagram illustrating an example of the overall configuration of transport system 1000 according to the present embodiment. The arrows in FIG. 1 indicate the directions of travel of robots 10 and 11.

As illustrated in FIG. 1, transport system 1000 according to the present embodiment includes robots 10 and 11. Robots 10 and 11 are both autonomous mobile robots that travel autonomously. Robot 10 transports an object of robot 10 (travels) along a transport route, and robot 11 transports an object of robot 11 (travels) along a transport route. FIG. 1 illustrates a state in which robots 10 and 11 have approached the same crosswalk from the opposite direction in order to travel.

In such cases, which of robots 10 and 11 is to travel with priority is determined using the travel determination method described below. Although details will be given later, the travel determination method of the present disclosure is characterized in that which of robots 10 and 11 is to travel with priority is determined based on public key certificates held by robots 10 and 11. Note that the travel determination method of the present disclosure is not limited to being used in the situation illustrated in FIG. 1, and may be used in any situation where robots 10 and 11 cannot travel at the same time. For example, a situation where the vehicles are approaching a road only wide enough for one vehicle to travel can be given as an example. Additionally, the travel determination method of the present disclosure may be used when determining which of a robot traveling on a road (e.g., an autonomous mobile vehicle) and a robot crossing the road (e.g., a robot traveling on a crosswalk) is to be given priority.

Note that the number of robots included in transport system 1000 is not particularly limited, and may be three or more.

Figure 2:
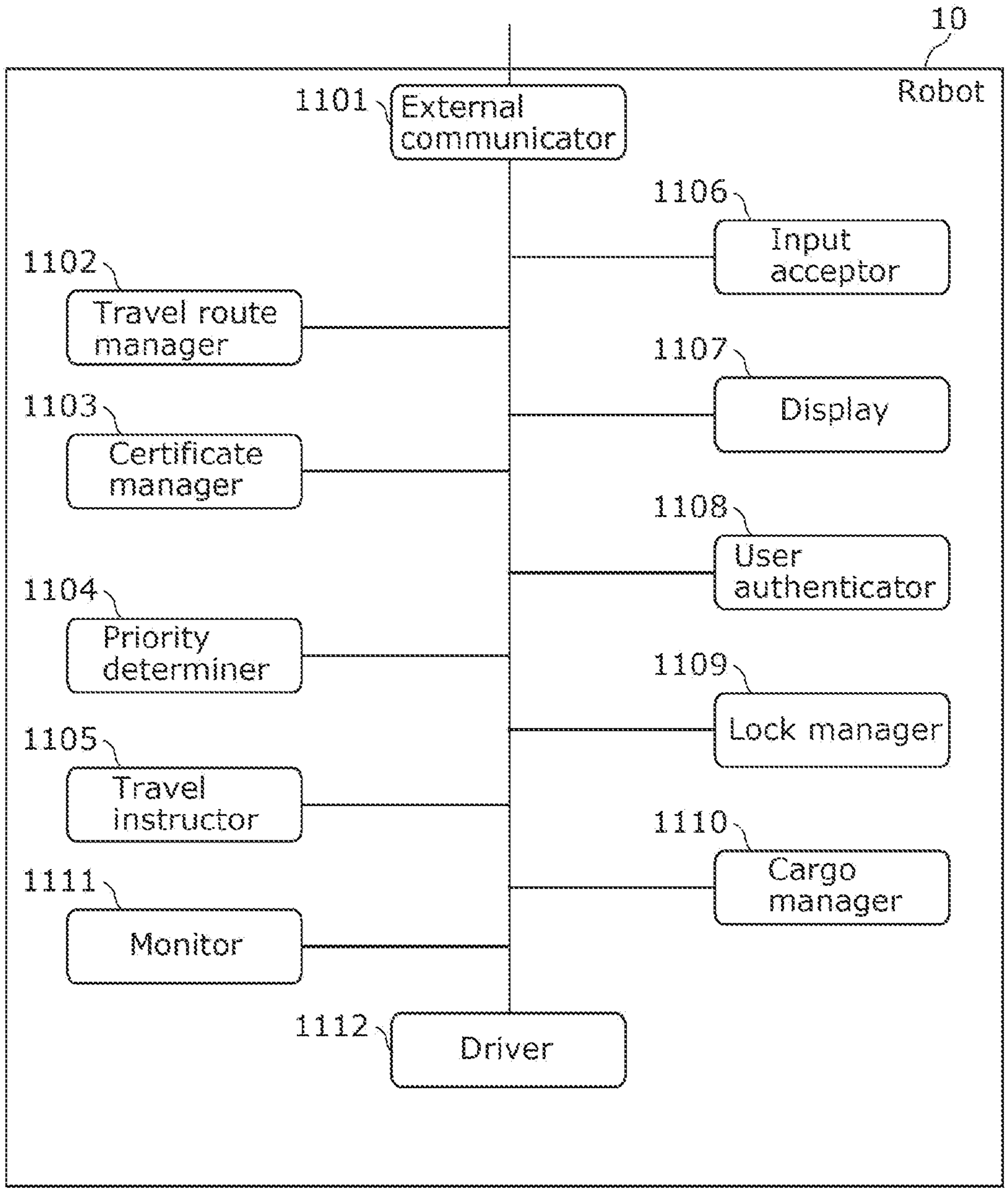
FIG. 2 is a block diagram illustrating an example of the functional configuration of a robot according to Embodiment 1.

The configurations of robots 10 and 11 will be described next with reference to FIG. 2. FIG. 2 is a block diagram illustrating an example of the functional configuration of robot 10 according to the present embodiment. The configuration of robot 11 may be the same as that of robot 10. Note that the object transported by the robots may also be called "cargo" or a "load".

Robot 10 includes external communicator 1101, travel route manager 1102, certificate manager 1103, priority determiner 1104, travel instructor 1105, input acceptor 1106, display 1107, user authenticator 1108, lock manager 1109, cargo manager 1110, monitor 1111, and driver 1112.

External communicator 1101 is communication circuitry (a communication module) for robot 10 to communicate with the exterior of robot 10. Robot 10 communicates with robot 11, for example, through external communicator 1101. External communicator 1101 receives a public key certificate held in robot 11 from robot 11. External communicator 1101 is an example of an "obtainer".

Travel route manager 1102 manages a travel route on which robot 10 transports cargo. Travel route manager 1102 is a storage device that stores a travel route set in advance. In addition to the travel route of robot 10, robot 10 may also store the travel route of a robot (e.g., robot 11) traveling within a predetermined range. The predetermined range is, for example, a range including the travel route of robot 10. Note that the following will also refer to "storing" as "holding". Additionally, the travel route is an example of a "transport route".

Figure 3:
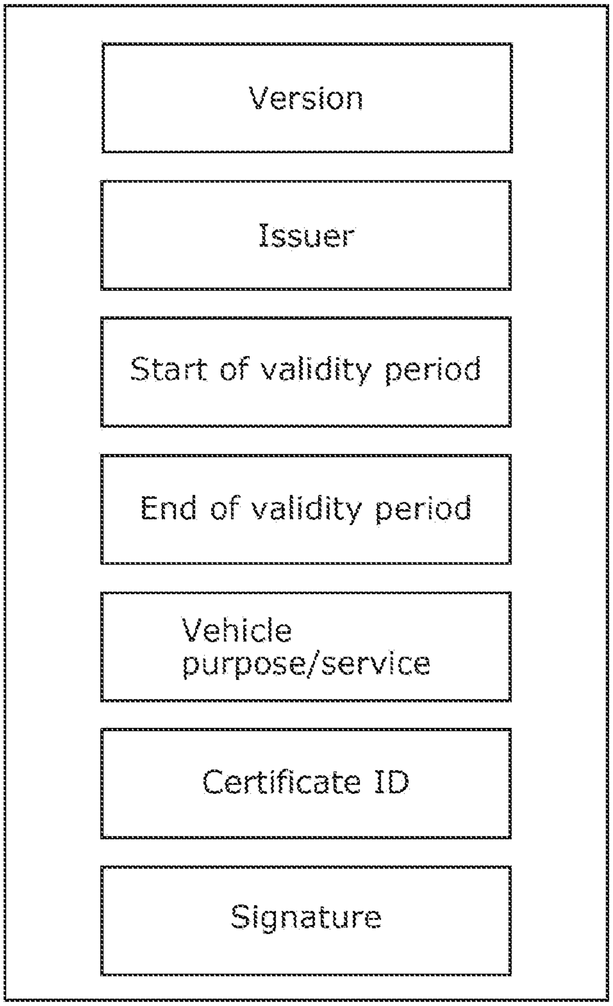
FIG. 3 is a diagram illustrating an example of the configuration of a public key certificate according to Embodiment 1.

Certificate manager 1103 manages a public key certificate held by robot 10 (see FIG. 3). Certificate manager 1103 is a storage device that stores a public key certificate set in advance. The public key certificate is an example of a "digital certificate".

Priority determiner 1104 determines a travel priority based on a determination table (described later; see FIG. 4) and the public key certificate. In the case of the situation illustrated in FIG. 1, priority determiner 1104 determines which of robots 10 and 11 is to travel with priority on the crosswalk based on the public key certificates held by robots 10 and 11 and the determination table. Note that the following will also refer to the determination as to which of robots 10 and 11 is to travel with priority on the crosswalk as "travel priority determination".

Additionally, priority determiner 1104 may determine whether travel routes of robots 10 and 11 have overlapping parts and, if so, whether robots 10 and 11 will meet at the overlapping parts. Priority determiner 1104 may determine the priority for cases where robots 10 and 11 meet at the overlapping parts.

Travel instructor 1105 obtains information pertaining to the travel route from travel route manager 1102, and issues a travel instruction to driver 1112.

Input acceptor 1106 accepts inputs (operations) from the user. Input acceptor 1106 is a touchscreen, switches, or the like through which the user makes direct inputs, but may accept inputs from the user through voice, gestures, or the like. Input acceptor 1106 may, for example, use communication to accept inputs regarding the receipt of an object from the user to which the object is delivered.

Display 1107 presents predetermined information to the user. If priority determiner 1104 has determined to prioritize the travel of robot 10 over that of robot 11, and robot 11 has slowed down or stopped, display 1107 may present an indication that robot 11 has slowed down or stopped in order to prioritize robot 10. Display 1107 is a display (a display device), a light (a light-emitting device), or the like that displays information directly to the user. Note that robot 10 may include a configuration in which presentations are made by sound, along with display 1107 or instead of display 1107.

User authenticator 1108 authenticates the user who receives the transported cargo using an existing technology such as a password, facial recognition, or the like.

Lock manager 1109 manages a lock to protect cargo manager 1110 such that the cargo can be transported safely. Lock manager 1109 unlocks the lock based on a result of the authentication performed by user authenticator 1108.

Cargo manager 1110 holds the cargo to be transported. Cargo manager 1110 is, for example, a box-shaped object. Cargo manager 1110 may have a heating function, a refrigeration function, a freezing function, or the like.

Monitor 1111 monitors the surroundings of robot 10 based on information from sensors, cameras, and the like in order to recognize the surrounding environment of robot 10. Based on this information, monitor 1111 may obtain the position of an object around robot 10, the distance from robot 10 to the object, the speed and direction of movement of the object, and the like. The sensors and cameras are not illustrated, but are installed in robot 10. The camera captures images, and the images may be still images or moving images.

Driver 1112 executes processing for moving forward, stopping, and the like based on instructions from travel instructor 1105.

Note that robots 10 and 11 may be any mobile entities capable of transporting objects. Robots 10 and 11 may be, for example, compact robots used for delivery services in residential neighborhoods. A compact robot includes, for example, a box-shaped storage compartment for storing an object, and travels with the object contained within the storage compartment. Additionally, at least one of robots 10 and 11 may be a robot that travels on a road. For example, at least one of robots 10 and 11 may travel across a crosswalk. Additionally, at least one of robots 10 and 11 may be a robot on which a person rides and which travels by being driven by that person, or may be a robot remotely controlled by a person (operator) from a distance. Robot 10 is an example of a "first vehicle", and robot 11 is an example of a "second vehicle".

Note that robots 10 and 11 may obtain a Certificate Revocation List ("CRL" hereinafter) issued by an external device (e.g., an authentication station).

The public key certificates and the determination table managed by certificate manager 1103 will be described here with reference to FIGS. 3 and 4. FIG. 3 is a diagram illustrating an example of the configuration of the public key certificate according to the present embodiment. The public key certificate illustrated in FIG. 3 is used in the travel priority determination performed by priority determiner 1104. For example, the public key certificate illustrated in FIG. 3 is used by priority determiner 1104 to determine the priority.

As illustrated in FIG. 3, the public key certificate includes a version, an issuer, the start and end of a validity period, a vehicle purpose/service, a certificate ID, and a signature of an authentication station. The present embodiment is characterized in that the public key certificate includes the "vehicle purpose/service".

"Version" indicates the version of the standard of the public key certificate. "Issuer" indicates the issuer of the public key certificate (e.g., an authentication station). "Start and end of validity period" indicates the start and end dates of the period during which the public key certificate is valid. "Certificate ID" indicates an identification number (serial number) of the public key certificate. "Signature of the authentication station" indicates a digital signature of the issuer of the public key certificate. The validity period included in the public key certificate may be set, for example, based on the useful life of robot 10, or may be set, for example, based on a period pertaining to the service provided by robot 10 (e.g., the validity period).

"Vehicle purpose/service" indicates at least one of the vehicle purpose of the vehicle (here, robot 10) and the service provided by the vehicle. The vehicle purpose is information based on the object to be transported by robot 10. The vehicle purpose may be different information depending on whether the object is a person (a living thing) or a product, for example. The type pertaining to the vehicle purpose (purpose type) includes, for example, an emergency vehicle, a non-emergency vehicle, and the like.

An emergency vehicle is a robot that is required to travel with the highest priority, and therefore requires other vehicles to stop, such as a robot that transports a highly urgent object, such as a medical patient, a robot that is on its way to a certain location in an emergency, and the like. An ambulance, a fire truck, a police car, and the like can be given as examples thereof.

A non-emergency vehicle is a robot that transports a healthy person, a product (e.g., a food and/or beverage product), or the like, such as a taxi, a home delivery robot, or the like. Home delivery robots have purpose types according to whether the product is a food and/or beverage product, e.g., "food delivery", which indicates that the purpose of the robot is food delivery, "normal", which indicates that the purpose of the robot is not food delivery, and the like.

Note that information indicating an ambulance, a fire truck, a police car, a taxi, a home delivery robot, or the like may be stored as the vehicle purpose.

In this manner, a public key certificate may be issued for each of the purpose types of robots 10 and 11, respectively. For example, a public key certificate may be issued for each object.

The service provided by the vehicle (the service provided using the vehicle) is information based on the service provided by robot 10. The service provided by the vehicle includes, for example, a service provided with a period of time pertaining to that service (e.g., a validity period). The service provided by the vehicle is information based on the period of time pertaining to that service (e.g., a validity period). The service provided by the vehicle is different information depending on the validity period, for example.

The validity period of the service is a period based on a limitation imparted by the delivery time of the service. The validity period of the service can also be said to be a period based on the delivery time of the service. For example, if the object is a food and/or beverage product, the limitation imparted by the delivery time of the service is a limitation imparted by the permissible delivery time of the food and/or beverage product. If the object is a food and/or beverage product, the delivery time is a time based on the permissible delivery time of the food and/or beverage product. Food and/or beverage products include hot foods, raw foods, and the like. Additionally, for example, if the object is a person, the limitation imparted by the delivery time of the service is a limitation imparted by the desired time of arrival at the destination.

The types pertaining to the service provided by the vehicle (the service types) include, for example, "urgent", which needs to be transported quickly, "specified time", in which the transport time is specified, and the like.

In this manner, a public key certificate may be issued for each of the types of services provided by robots 10 and 11, respectively.

In this manner, the public key certificate includes information based on at least one of the purpose of robot 10 and the service provided by robot 10. In other words, robot 10 holds a public key certificate based on at least one of the purpose of robot 10 and the service provided by robot 10. Likewise, robot 11 also holds a public key certificate based on at least one of the purpose of robot 11 and the service provided by robot 11. The public key certificate held by robot 10 is an example of a "first digital certificate", and the public key certificate held by robot 11 is an example of a "second digital certificate".

Note that the public key certificate may be issued by the authentication station when robot 10 is manufactured and stored in robot 10 in advance. In other words, the public key certificate may already be held in robot 10 when robot 10 is delivered. This is useful in cases where the purpose of robot 10 is set in advance. In addition, the public key certificate may be issued by the authentication station after robot 10 is manufactured and stored in robot 10 at a later date. A public key certificate may be issued for each food delivery, for example.

FIG. 4 is a diagram illustrating an example of the determination table according to the present embodiment. The determination table illustrated in FIG. 4 is used in the travel priority determination performed by priority determiner 1104. For example, the determination table illustrated in FIG. 4 is used by priority determiner 1104 to determine the priority.

As illustrated in FIG. 4, the determination table is a table in which priorities are associated with vehicle purposes/services. The example in FIG. 4 indicates that a priority "S" is the highest priority and a priority "D" is the lowest priority. The "vehicle purpose/service" in the determination table covers the types that can be included in the "vehicle purpose/service" of the public key certificate, for example. In the example in FIG. 4, five levels of priority are set for corresponding ones of the vehicle purposes/services of the public key certificates in the determination table.

For "emergency/emergency vehicle", the priority level is "S". For "food delivery" and "urgent", the priority level is "A". For "normal" (a delivery aside from food delivery) and "urgent", the priority level is "B". For "food delivery", the priority level is "C". For "normal", the priority level is "D". Note that the priority is not limited to five levels, and may be two or more levels. Priorities "C" and "D" indicate cases which are not urgent.

The determination table illustrated in FIG. 4 is information used in common by all robots in transport system 1000, including robots 10 and 11.

1-2. Operations of Transport System

Figure 5:
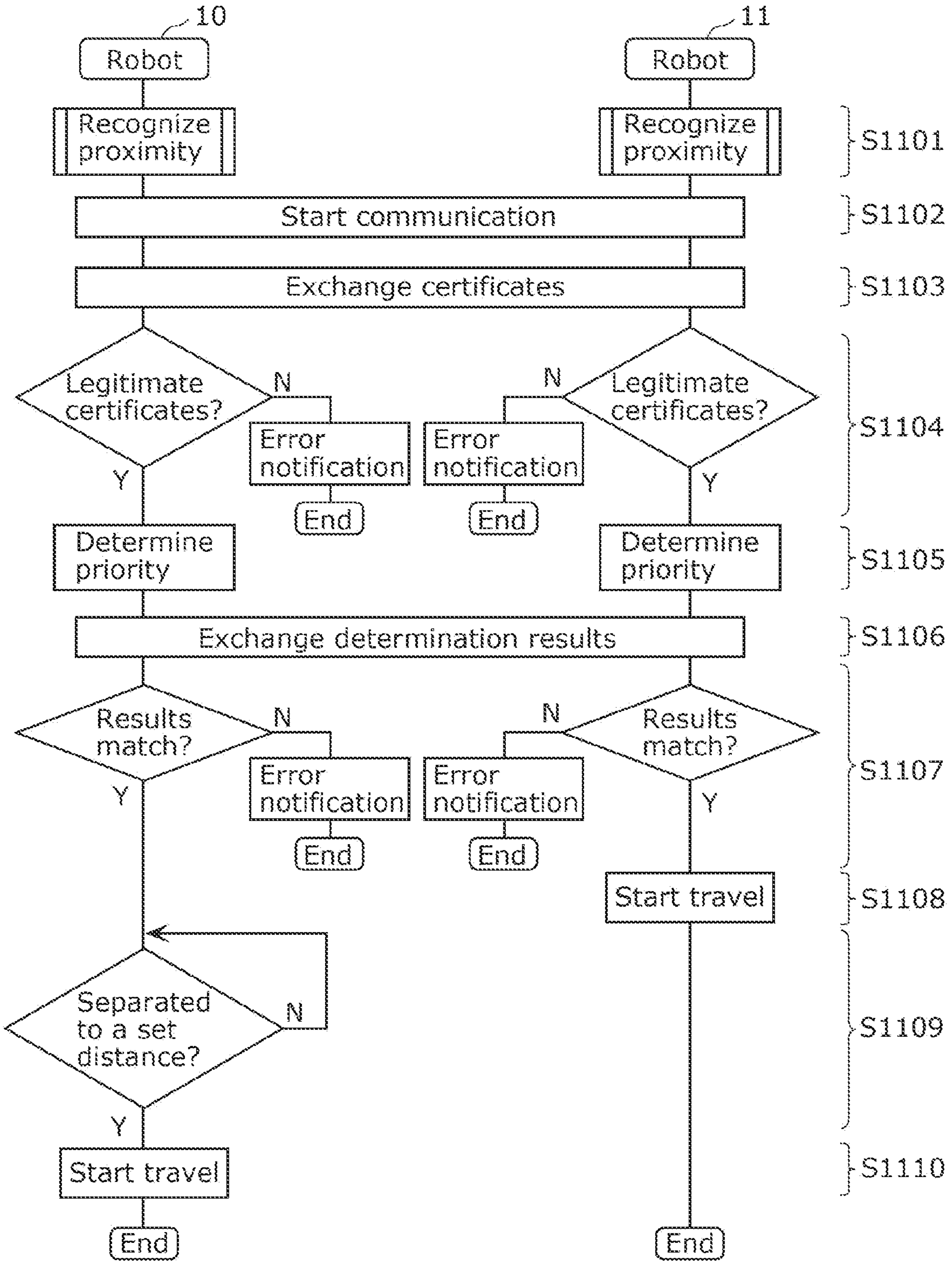
FIG. 5 is a sequence chart illustrating an example of operations performed by the transport system according to Embodiment 1.
Figure 6:
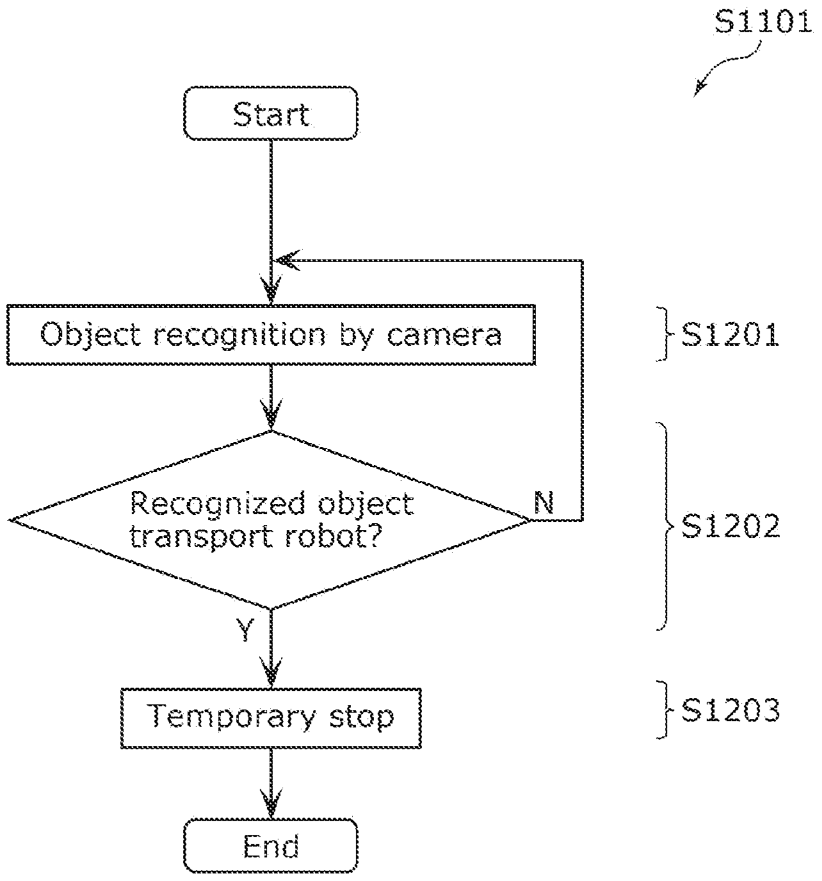
FIG. 6 is a flowchart illustrating an example of operations for detecting proximity between vehicles, according to Embodiment 1.

Operations of transport system 1000 configured as described above will be described next with reference to FIGS. 5 to 7. FIG. 5 is a sequence chart illustrating an example of the operations of transport system 1000 (a travel determination method) according to the present embodiment. FIG. 5 illustrates a travel determination method in which a determination is made pertaining to the travel of robots 10 and 11 (an example of "travel of vehicles") in transport system 1000 including robots 10 and 11 that transport an object to a location that is set. In FIG. 5, both robots 10 and 11 are assumed to be transporting an object.

(S1101) Robots 10 and 11 perform proximity recognition as to whether those robots are near each other, continuously or at set intervals of time, and when robots 10 and 11 are near each other, robots 10 and 11 recognize that they are near each other. An example of a recognition method will be described later with reference to FIG. 6. Step S1101 is executed by monitor 1111, for example. In addition, in step S1101, it is determined whether robot 10 and robot 11 are near each other in the periphery of a part where the transport route of robot 10 and the transport route of robot 11 overlap (e.g., an overlapping segment, which is a crosswalk in the example illustrated in FIG. 1). The part where the transport route of robot 10 and the transport route of robot 11 overlap may be a position where the transport routes intersect, or may be a segment where the transport routes overlap. Step S1101 is an example of second determining.

If robot 10 and robot 11 are determined to be near each other in the second determining, obtaining (e.g., S1103) and first determining (e.g., S1104 to S1107) are executed.

(S1102) Robots 10 and 11, which are near each other, start communicating with each other. Although the communication method used for the communication by robots 10 and 11 is not particularly limited, two-dimensional codes such as QR codes (registered trademark; the same applies hereinafter) may be read by a camera when an object is recognized, and means of communication may be established with each other, or communication with all robots may be established when the robots start traveling. Step S1102 is executed by external communicator 1101, for example. Note that an Internet Protocol (IP) address, the communication method, and the like of the robot are stored in the QR code. The QR codes are attached to the exterior surfaces of robots 10 and 11, for example.

(S1103) Upon starting communication, robots 10 and 11 exchange the public key certificates which they hold. Robot 10 transmits the public key certificate it holds (the first digital certificate) to robot 11 through external communicator 1101, and robot 11 transmits the public key certificate it holds (the second digital certificate) to robot 10 via external communicator. Step S1103 is an example of obtaining. Note that in step S1103, robot 10 may obtain the public key certificate of robot 10 from certificate manager 1103. In this case, priority determiner 1104 functions as an obtainer that obtains the public key certificate of robot 10 from certificate manager 1103.

(S1104) Robots 10 and 11 determine whether the obtained public key certificates are legitimate public key certificates. Robot 10 determines whether the public key certificate obtained from robot 11 is a legitimate public key certificate, and robot 11 determines whether the public key certificate obtained from robot 10 is a legitimate public key certificate. It can also be said that robots 10 and 11 determine whether there is an error in the verification of the public key certificates (public key certificate verification processing). The public key certificate verification processing includes, for example, decrypting a signature contained in the public key certificate using a public key and verifying whether the signature is correct. In step S1104, it is determined whether the obtained public key certificates are illegitimate public key certificates, such as having been rewritten.

Then, if the public key certificates are not legitimate, i.e., if an error is determined in the public key certificate verification processing ("N" in S1104 of FIG. 5), robots 10 and 11 make notifications of the error and end the processing. If an error is determined by either of robots 10 and 11, a notification of the error is made and the processing is ended. On the other hand, if the public key certificates are legitimate, i.e., if errors are not determined in the public key certificate verification processing ("Y" in S1104 of FIG. 5), robots 10 and 11 move to step S1105. Step S1104 is executed by priority determiner 1104, for example.

(S1105) Robots 10 and 11 determine the priority pertaining to travel based on the information of the vehicle purposes/services described in both public key certificates from the obtained public key certificates and the determination table illustrated in FIG. 4. Priority determiner 1104 of robot 10 determines the priority of robot 10 based on the information of the vehicle purpose/service in the public key certificate held and the determination table illustrated in FIG. 4, and determines the priority of robot 11 based on the information of the vehicle purpose/service in the public key certificate obtained from robot 11 and the determination table illustrated in FIG. 4. Likewise, the priority determiner of robot 11 determines the priority of robot 11 based on the information of the vehicle purpose/service in the public key certificate held and the determination table illustrated in FIG. 4, and determines the priority of robot 10 based on the information of the vehicle purpose/service in the public key certificate obtained from robot 10 and the determination table illustrated in FIG. 4.

For example, if the purpose type is "food delivery" and the service type is "urgent" in the information of the vehicle purpose/service in the public key certificate held by priority determiner 1104 of robot 10, the priority of robot 10 is determined to be "A". If the purpose type is "food delivery" and the service type is not "urgent" in the information of the vehicle purpose/service in the public key certificate obtained from robot 11, priority determiner 1104 of robot 10 determines that the priority of robot 11 is "C". Likewise, the priority determiner of robot 11 determines the priorities of robots 10 and 11, respectively.

Additionally, priority determiner 1104 may determine which of robots 10 and 11 is to travel with priority based on the determined priorities of robots 10 and 11. Priority determiner 1104 determines that the robot with the higher priority among robots 10 and 11 is to travel with priority. For example, in the first determining, a first priority at which robot 10 is to travel through the overlapping part is determined based on the public key certificate of robot 10, a second priority at which robot 11 is to travel through the overlapping part is determined based on the public key certificate of robot 11, and which of robots 10 and 11 is to travel with priority is determined based on the first priority and the second priority determined. The processing of step S1105 can also be called processing for determining the priority ranks of robots 10 and 11.

Note that the processing of step S1105 may be executed by either of robots 10 and 11.

(S1106) Robots 10 and 11 exchange the priority determination results. Robots 10 and 11 transmit the priority determination results to each other.

(S1107) Robots 10 and 11 determine whether the determination results match. If the determination results do not match ("N" in S1107 of FIG. 5), robots 10 and 11 make notifications of the error and end the processing. If either of robots 10 and 11 determine that the determination results do not match, a notification of the error is made and the processing is ended. On the other hand, if the determination results match ("Y" in S1107 of FIG. 5), robots 10 and 11 move to step S1108.

Thus, when each of robots 10 and 11 travels on the transport route, it is determined, based on the public key certificate of robot 10 and the public key certificate of robot 11, which of robots 10 and 11 is to travel with priority on the overlapping part, as indicated by steps S1105 to S1107. Steps S1105 to S1107 are an example of first determining.

Note that the first determining is executed when a part of the transport route of robot 10 and the transport route of robot 11 overlap.

(S1108) The robot determined to have the higher priority starts traveling. In the example in FIG. 5, robot 11 has a higher priority than robot 10, and thus in step S1108, robot 11 starts traveling. In the example in FIG. 1, robot 11 starts traveling on the crosswalk. Robot 10 slows down or stops while robot 11 is traveling with priority. In other words, robot 10 does not travel on the crosswalk while robot 11 is traveling on the crosswalk. Additionally, robot 10 may start traveling on a detour route rather than traveling on the crosswalk.

Note that if the processing before step S1108 was performed during the transport performed by robots 10 and 11 (e.g., during the delivery of the objects in robots 10 and 11), travel instructor 1105 of robot 10 may further control the travel of robot 10 in step S1108. Travel instructor 1105 of robot 10 may cause robot 10 to slow down or stop before entering the crosswalk.

(S1109) Robot 10, which has been determined to have the lower priority, determines whether robot 11, which has been determined to have the higher priority, has moved away from robot 10 by a set distance after traveling on the crosswalk. Priority determiner 1104 of robot 10 determines whether the distance between robots 10 and 11, obtained as a result of monitoring by monitor 1111, is at least the set distance. If robot 11 is not at the set distance from robot 10 after traveling on the crosswalk ("N" in S1109 of FIG. 5), robot 10 continues to slow down or stop, and makes the determination of step S1109 again. If robot 11 has moved away by the set distance from robot 10 after traveling on the crosswalk ("Y" in S1109 of FIG. 5), robot 10 ends the slowing down or the stop, and moves to step S1110.

(S1110) Robot 10, which has been determined to have the lower priority, determines whether robot 11, which has been determined to have the higher priority, has started traveling normally after having moved away from robot 10 by the set distance after traveling over the crosswalk.

Although FIG. 1 illustrates an example in which robots 10 and 11 enter the crosswalk from opposite sides, which of robots 10 and 11 is to travel with priority may be determined through the processing illustrated in FIG. 5 even if robots 10 and 11 enter the crosswalk from the same direction.

Note that the proximity recognition (proximity determination) in step S1101 need not be performed. For example, if robots 10 and 11 are capable of exchanging information about the transport routes and transport times with each other in advance, the processing of steps S1102 to S1107 may be performed before the robots approach each other at the crosswalk.

Although the example in FIG. 5 illustrates an example in which the first determining is executed when robot 10 and robot 11 are determined to be near each other, the configuration is not limited thereto, and the first determining may be executed when robot 10 and robot 11 are separated from each other. Robot 10 and robot 11 being separated from each other means, for example, that they are far enough away to not be detected by monitor 1111.

The processing performed in step S1101 will be described next with reference to FIG. 6. FIG. 6 is a flowchart illustrating an example of operations for detecting proximity between the vehicles (between the robots), according to the present embodiment. Although FIG. 6 illustrates a proximity recognition method performed using a camera, the method is not limited thereto, and another proximity recognition method may be employed. A method using a proximity sensor, LIDAR, or the like can be given as an example of another proximity recognition method. Additionally, although the processing performed in robot 10 will be described below, the same processing is performed in robot 11 as well.

(S1201) Monitor 1111 of robot 10 recognizes an object captured from an image captured by the camera. In the example in FIG. 1, monitor 1111 recognizes robot 11 as an object.

(S1202) Monitor 1111 determines whether the recognized object is a transport robot. In the example in FIG. 1, monitor 1111 determines whether robot 11 is a transport robot that transports an object. Monitor 1111 may make the determination using a trained machine learning model that takes the image as an input and outputs an indication as to whether the object is a transport robot. Additionally, monitor 1111 may determine that robot 11 is a transport robot based on the image when robot 11 has a predetermined mark or the like.

If robot 11 is a transport robot ("Y" in S1202), the sequence moves to step S1203, whereas if robot 11 is not a transport robot ("N" in S1202), the sequence returns to step S1201.

(S1203) Robot 10 temporarily stops traveling in order to execute the priority determination.

Travel by each robot after the priorities have been determined will be described next with reference to FIG. 7. FIG. 7 is a diagram illustrating an example of an image of an avoidance action based on a result of determining the priorities, according to the present embodiment. FIG. 7 illustrates a case where of robots 10 and 11, robot 10 has been determined to travel with priority.

Figure 7:
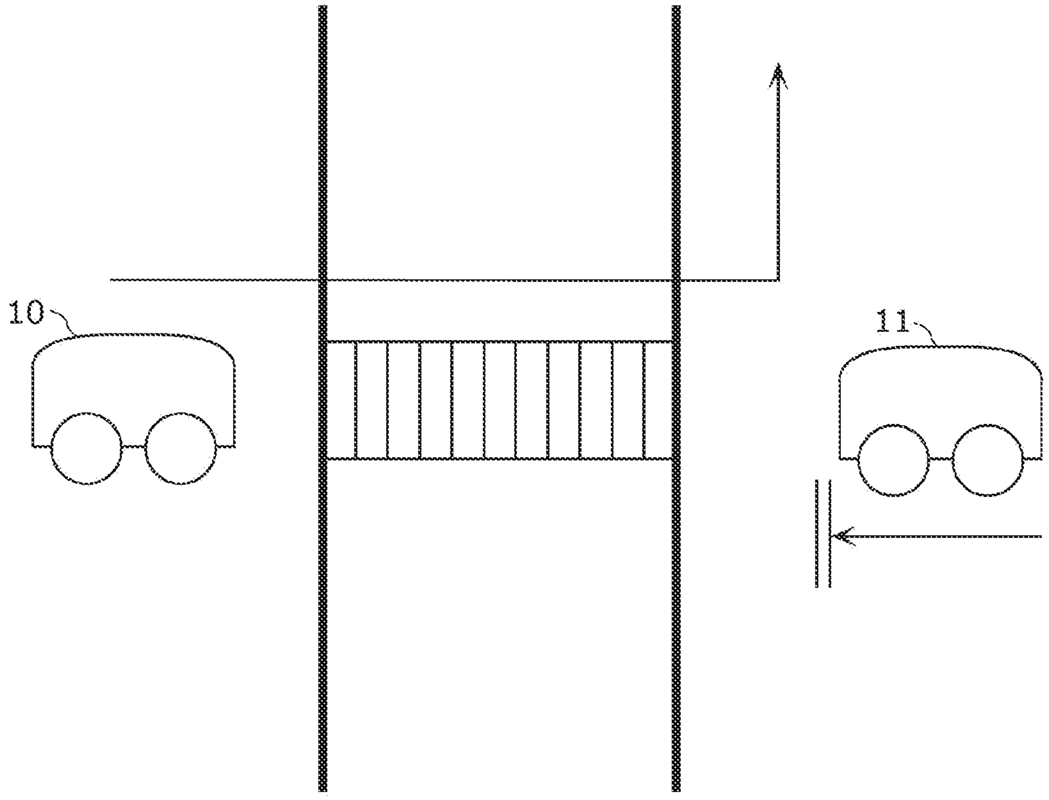
FIG. 7 is a diagram illustrating an example of an image of an avoidance action based on a result of determining priorities, according to Embodiment 1.

FIG. 7 illustrates a case where proximity between the vehicles is detected and, as a result of the priority determination, the one robot 11 stops temporarily and the other robot 10 travels with priority. Through this, for example, robot 10, for which the service type is "urgent", can travel over the crosswalk with priority over robot 11, for which the service type is not "urgent".

Variation on Embodiment 1

Figure 8:
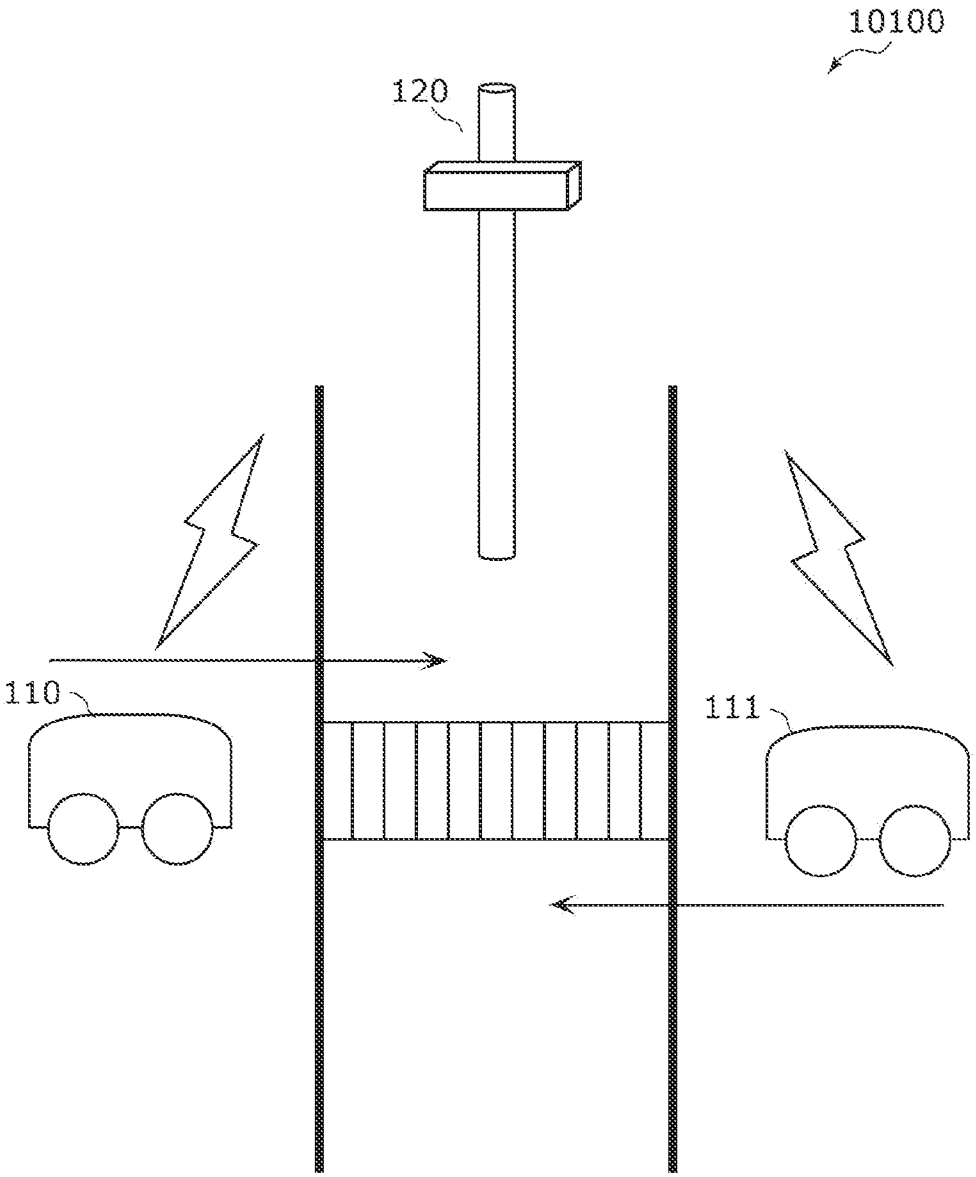
FIG. 8 is a diagram illustrating an example of the overall configuration of a transport system according to a variation on Embodiment 1.

A transport system according to the present variation will be described hereinafter with reference to FIGS. 8 to 12. The following descriptions will focus on the differences from Embodiment 1, and descriptions of configurations that are the same as or similar to those in Embodiment 1 will be omitted or simplified. FIG. 8 is a diagram illustrating an example of the overall configuration of transport system 10100 according to the present variation.

As illustrated in FIG. 8, transport system 10100 according to the present variation includes robots 110 and 111 and roadside device 120. Transport system 10100 according to the present variation has the same configuration as transport system 1000 according to Embodiment 1, with the addition of roadside device 120. Robots 110 and 111 are communicably connected to roadside device 120. In the present variation, roadside device 120 makes various determinations, including priority determinations.

Roadside device 120 is fixedly installed on a road, a sidewalk, or the like. Roadside device 120 is higher than robots 110 and 111, for example. Roadside device 120 may be, for example, a utility pole, a traffic signal, a sign, or the like having a communication function.

Figure 9:
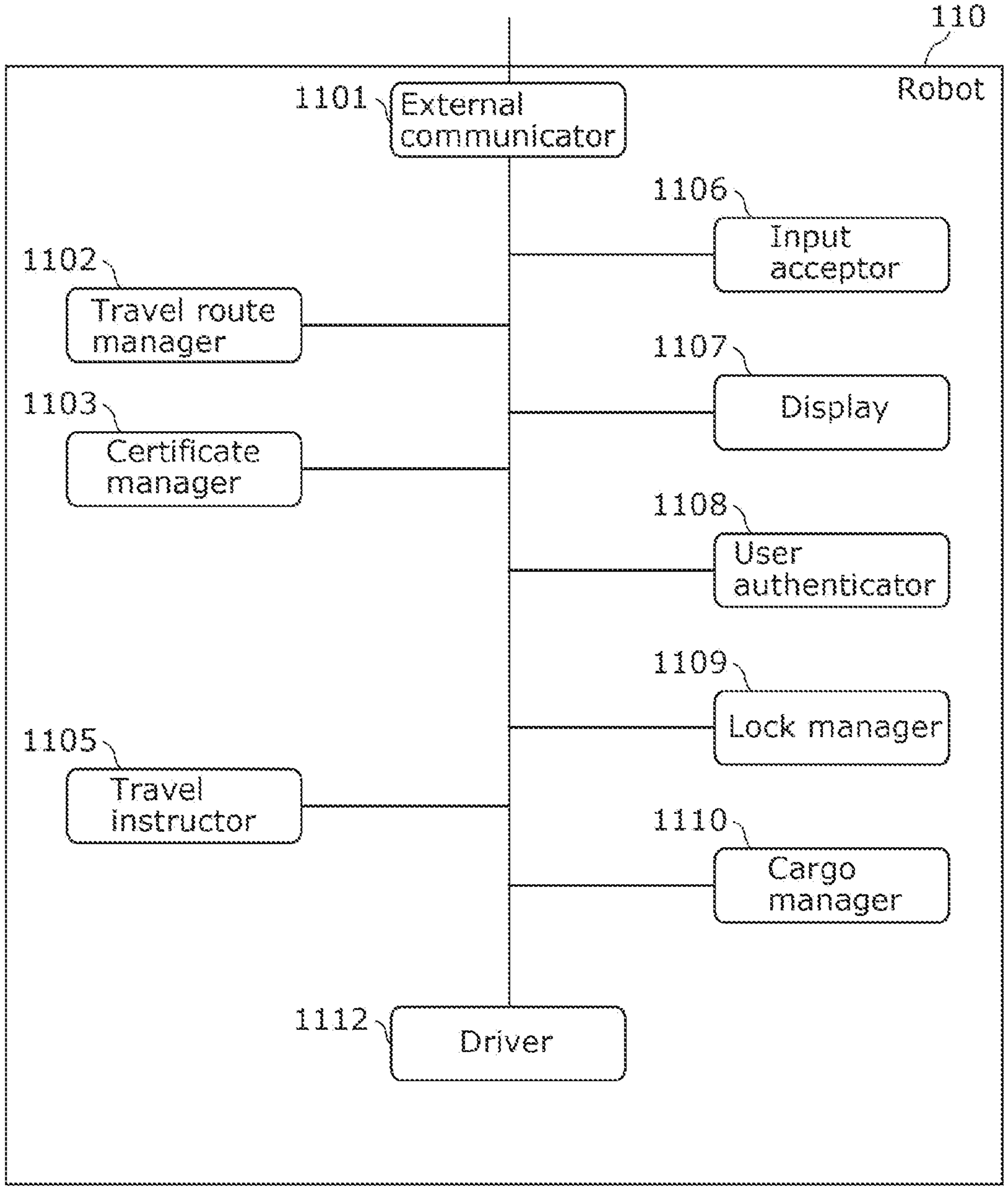
FIG. 9 is a block diagram illustrating an example of the functional configuration of a robot according to a variation on Embodiment 1.

FIG. 9 is a block diagram illustrating an example of the functional configuration of robot 110 according to the present variation. The configuration of robot 111 may be the same as that of robot 110.

Robot 110 includes external communicator 1101, travel route manager 1102, certificate manager 1103, travel instructor 1105, input acceptor 1106, display 1107, user authenticator 1108, lock manager 1109, cargo manager 1110, and driver 1112. In other words, robot 110 has the configuration of robot 10 according to Embodiment 1, but with priority determiner 1104 and monitor 1111 removed.

Figure 10:
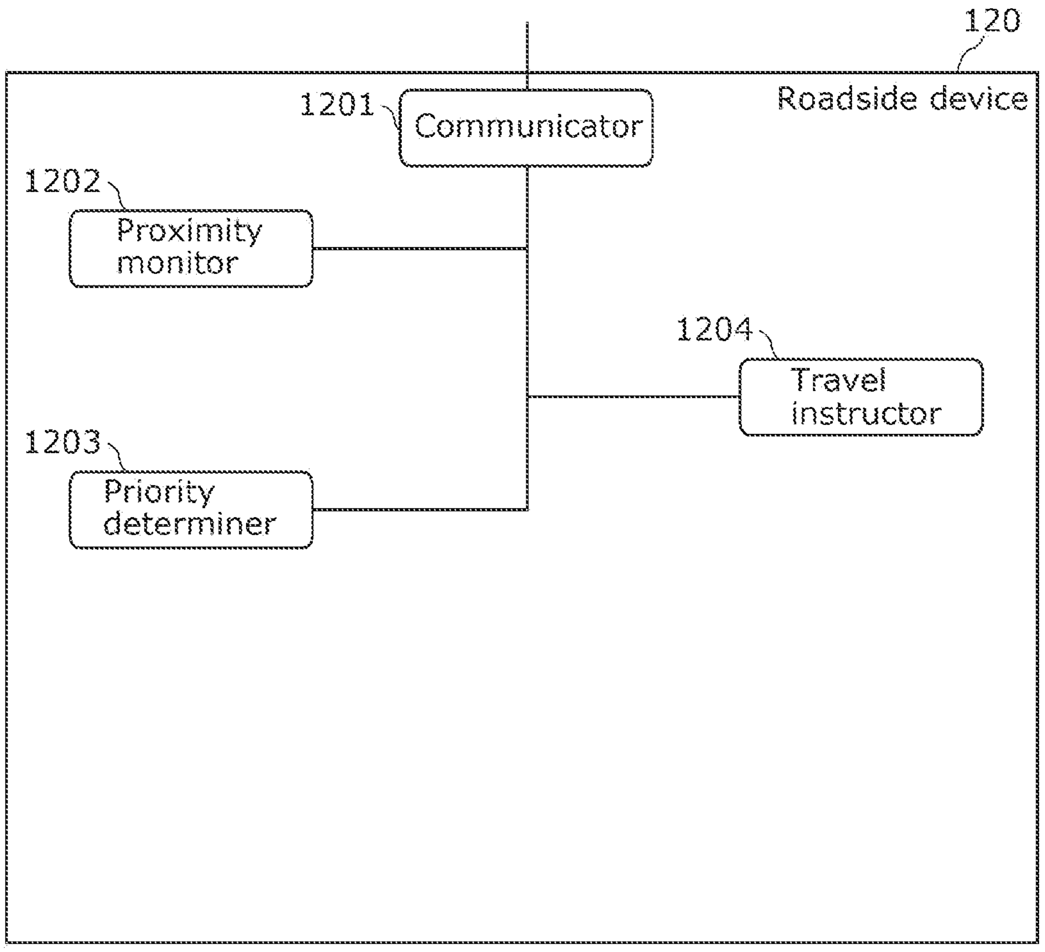
FIG. 10 is a block diagram illustrating an example of the functional configuration of a roadside device according to a variation on Embodiment 1.

FIG. 10 is a block diagram illustrating an example of the functional configuration of roadside device 120 according to the present variation.

As illustrated in FIG. 10, roadside device 120 includes communicator 1201, proximity monitor 1202, priority determiner 1203, and travel instructor 1204.

Communicator 1201 is communication circuitry (a communication module) for roadside device 120 to communicate with the exterior of roadside device 120. Roadside device 120 communicates with robots 110 and 111 through communicator 1201, for example.

Proximity monitor 1202 monitors the surroundings of robots 110 and 111 based on information from sensors, cameras, or the like. Proximity monitor 1202 monitors the proximity of robots 110 and 111 based on this information. The sensors and cameras may be installed in roadside device 120, or may be implemented by other constituent elements (e.g., surveillance cameras). Images captured by the cameras may be, for example, aerial images in which robots 110 and 111 are present.

Priority determiner 1203 determines travel priorities of robots 110 and 111 based on the determination table (see FIG. 4) and public key certificates held by robots 110 and 111. Priority determiner 1203 executes the processing performed by priority determiner 1104 according to Embodiment 1. Priority determiner 1203 is an example of a "determiner".

Travel instructor 1204 transmits travel instructions to robots 110 and 111 through communicator 1201 based on the results of determining the travel priorities. The travel instruction includes an instruction to prioritize travel and an instruction to slow down or stop.

Figure 11:
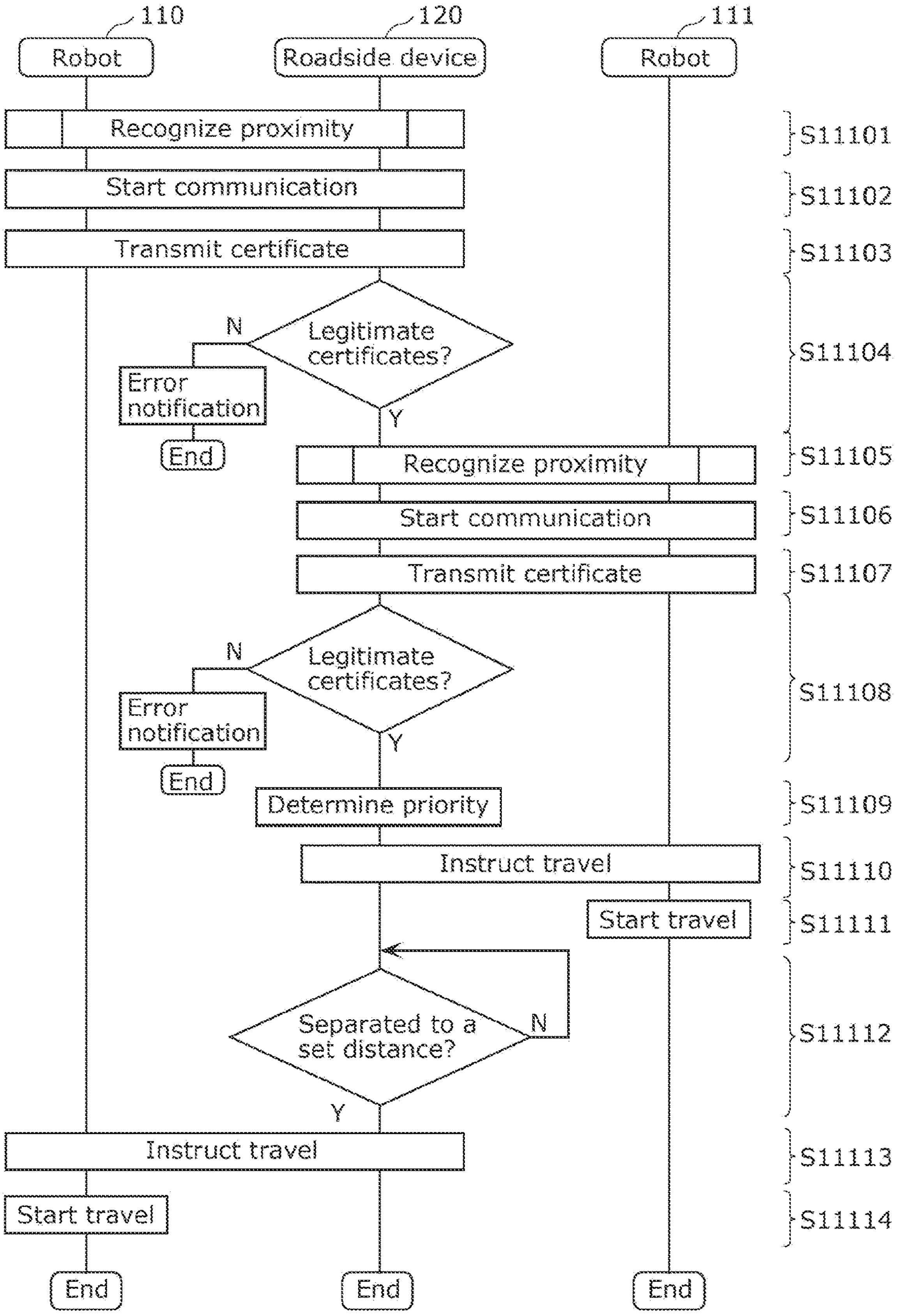
FIG. 11 is a sequence chart illustrating an example of operations performed by the transport system according to a variation on Embodiment 1.
Figure 12:
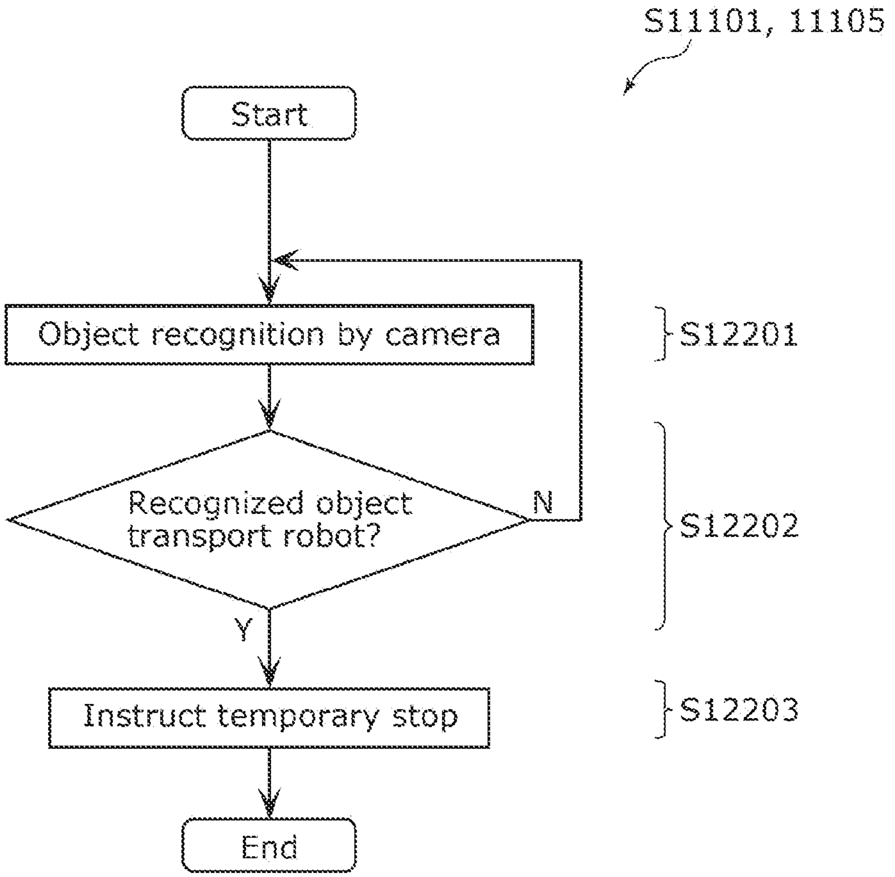
FIG. 12 is a flowchart illustrating an example of operations for detecting proximity between vehicles, according to a variation on Embodiment 1.

Operations of transport system 10100 configured as described above will be described next with reference to FIGS. 11 and 12. FIG. 11 is a sequence chart illustrating an example of operations of transport system 10100 (a travel determination method) according to the present variation. FIG. 11 illustrates a travel determination method in which a determination is made pertaining to the travel of robots 110 and 111 ("travel of vehicles") in transport system 10100 including robots 110 and 111 that transport an object to a location that is set. In FIG. 11, both robots 110 and 111 are assumed to be transporting an object.

(S11101) Roadside device 120 performs proximity recognition as to whether robots 110 and 111 are near each other, continuously or at set intervals of time. For example, when robot 110 is near roadside device 120, robot 110 recognizes the proximity. An example of a recognition method will be described later with reference to FIG. 12.

(S11102) Roadside device 120 starts communicating with robot 110 that has approached, through communicator 1201. Although the communication method used for the communication by roadside device 120 and robot 110 is not particularly limited, a QR code provided on robot 110 may be read by a camera when an object is recognized, and means of communication may be established with each other, or communication with all robots may be established when the robots start traveling.

(S11103) When communication between roadside device 120 and robot 110 starts, robot 110 transmits the public key certificate it holds to roadside device 120.

(S11104) Roadside device 120 determines whether the public key certificate obtained from robot 110 is a legitimate public key certificate. It can also be said that roadside device 120 determines whether there is an error in the verification of the public key certificate (public key certificate verification processing). Then, if the public key certificate is not legitimate, i.e., if an error is determined in the public key certificate verification processing ("N" in S11104 of FIG. 11), roadside device 120 makes a notification of the error and end the processing. On the other hand, if the public key certificate is legitimate, i.e., if an error is not determined in the public key certificate verification processing ("Y" in S11104 of FIG. 11), roadside device 120 determines that the public key certificate can be used to determine the priorities with robot 111. Step S11104 is executed by priority determiner 1203, for example.

(S11105) Roadside device 120 recognizes the proximity of robot 111 when robot 111 is near roadside device 120. An example of a recognition method will be described later with reference to FIG. 12.

(S11106) Roadside device 120 starts communicating with robot 111 that has approached, through communicator 1201. Although the communication method used for the communication by roadside device 120 and robot 111 is not particularly limited, a QR code provided on robot 111 may be read by a camera when an object is recognized, and means of communication may be established with each other, or communication with all robots may be established when the robots start traveling.

(S11107) When communication between roadside device 120 and robot 111 starts, robot 111 transmits the public key certificate it holds to roadside device 120.

(S11108) Roadside device 120 determines whether the public key certificate obtained from robot 111 is a legitimate public key certificate. The processing of step S11108 is similar to that of step S11104. If the public key certificate is not legitimate ("N" in S11108 of FIG. 11), roadside device 120 makes a notification of the error and ends the processing. On the other hand, if the public key certificate is legitimate ("Y" in S11108 of FIG. 11), roadside device 120 determines that the public key certificate can be used to determine the priorities with robot 110. Step S11108 is executed by priority determiner 1203, for example.

(S11109) Priority determiner 1203 of roadside device 120 determines the priorities pertaining to the travel of robots 110 and 111 respectively based on the information of the vehicle purposes/services described in the two public key certificates obtained and the determination table illustrated in FIG. 4. Priority determiner 1203 outputs information indicating which of robots 110 and 111 is to travel with priority to travel instructor 1204. For example, priority determiner 1203 outputs the priorities of robots 110 and 111, respectively, to travel instructor 1204. The information indicating which of robots 110 and 111 is to be prioritized is an example of a "determination result".

(S11110) Travel instructor 1204 of roadside device 120 transmits the travel instruction to the robot determined to have the higher priority based on the determination result, and transmits an instruction to slow down or stop to the robot determined to have the lower priority. In the example in FIG. 11, travel instructor 1204 transmits, through communicator 1201, an instruction to robot 110 to slow down or stop, and transmits a travel instruction to robot 111.

(S11111) The robot that has obtained the travel instruction starts traveling. In the example in FIG. 11, robot 111 starts traveling on the crosswalk. This makes it possible to prioritize the travel of the robot having the higher priority in parts of the transport routes that overlap for robots 110 and 111.

(S11112) Travel instructor 1204 of roadside device 120 determines whether the robot determined to have the higher priority has moved away by a set distance. Here, the set distance may be the distance between roadside device 120 and the robot determined to have the higher priority, or may be the distance between the robot determined to have the lower priority and the robot determined to have the higher priority. If robot 111 has not moved away from robot 110 or roadside device 120 by the set distance after traveling on the crosswalk ("N" in S11112 of FIG. 11), travel instructor 1204 returns to step S11112, and makes the determination of step S11112 again. If robot 111 has moved away from robot 110 or roadside device 120 by the set distance after traveling on the crosswalk ("Y" in S11112 of FIG. 11), travel instructor 1204 moves to step S11113.

(S11113) Roadside device 120 transmits a travel instruction to the robot determined to have the lower priority.

(S11114) The robot that has obtained the travel instruction starts traveling. In the example in FIG. 11, robot 110 starts traveling on the crosswalk.

As described above, the priority determination may be executed by an external device (roadside device 120, in the foregoing) external to robots 110 and 111, where robot 110 may receive an instruction to slow down or stop from the external device, and robot 111 may receive an instruction to travel from the external device.

Note that steps S11101 to S11104 and steps S11105 to S11108 may be executed in parallel.

The processing of steps S11101 and S11105 will be described next with reference to FIG. 12. FIG. 12 is a flowchart illustrating an example of operations for detecting proximity between vehicles, according to the present variation. Although FIG. 12 illustrates a proximity recognition method performed using a camera, the method is not limited thereto, and another proximity recognition method may be employed. A method using a proximity sensor, LIDAR, or the like can be given as an example of another proximity recognition method.

(S12201) Proximity monitor 1202 of roadside device 120 recognizes a captured object from an image captured by the camera. In the example in FIG. 8, proximity monitor 1202 recognizes robots 110 and 111 as objects.

(S12202) Proximity monitor 1202 determines whether the recognized object is a transport robot. In the example in FIG. 8, proximity monitor 1202 determines whether robots 110 and 111 are transport robots that transport an object, respectively. Proximity monitor 1202 may make the determination using a trained machine learning model that takes the image as an input and outputs an indication as to whether the object is a transport robot.

If robots 110 and 111 are both transport robots ("Y" in S12202), the sequence moves to step S12203, whereas if at least one of robots 110 and 111 is not a transport robot ("N" in S12202), the sequence returns to step S12201.

(S12203) Roadside device 120 transmits an instruction to robots 110 and 111, respectively, to stop traveling, in order to determine the priorities.

Accordingly, in transport system 10100, roadside device 120 can determine the priorities collectively, such that robots 110 and 111 need not perform the determination processing. This makes it possible to reduce the amount of processing performed by robots 110 and 111, which have limited computational resources. Additionally, when roadside device 120 performs proximity recognition, roadside device 120 may be able to recognize proximity, even if robots 110 and 111 do not recognize proximity to each other, which increases the reliability of the proximity recognition.

Embodiment 2

A transport system according to the present embodiment will be described hereinafter with reference to FIGS. 13 to 18. The following descriptions will focus on the differences from Embodiment 1, and descriptions of configurations that are the same as or similar to those in Embodiment 1 will be omitted or simplified. The present embodiment will describe an example in which robots hold a plurality of public key certificates, and switch the public key certificates used to determine the priorities in accordance with the details of the current service, purpose, or the like.

2-1. Configuration of Transport System

Figure 13:
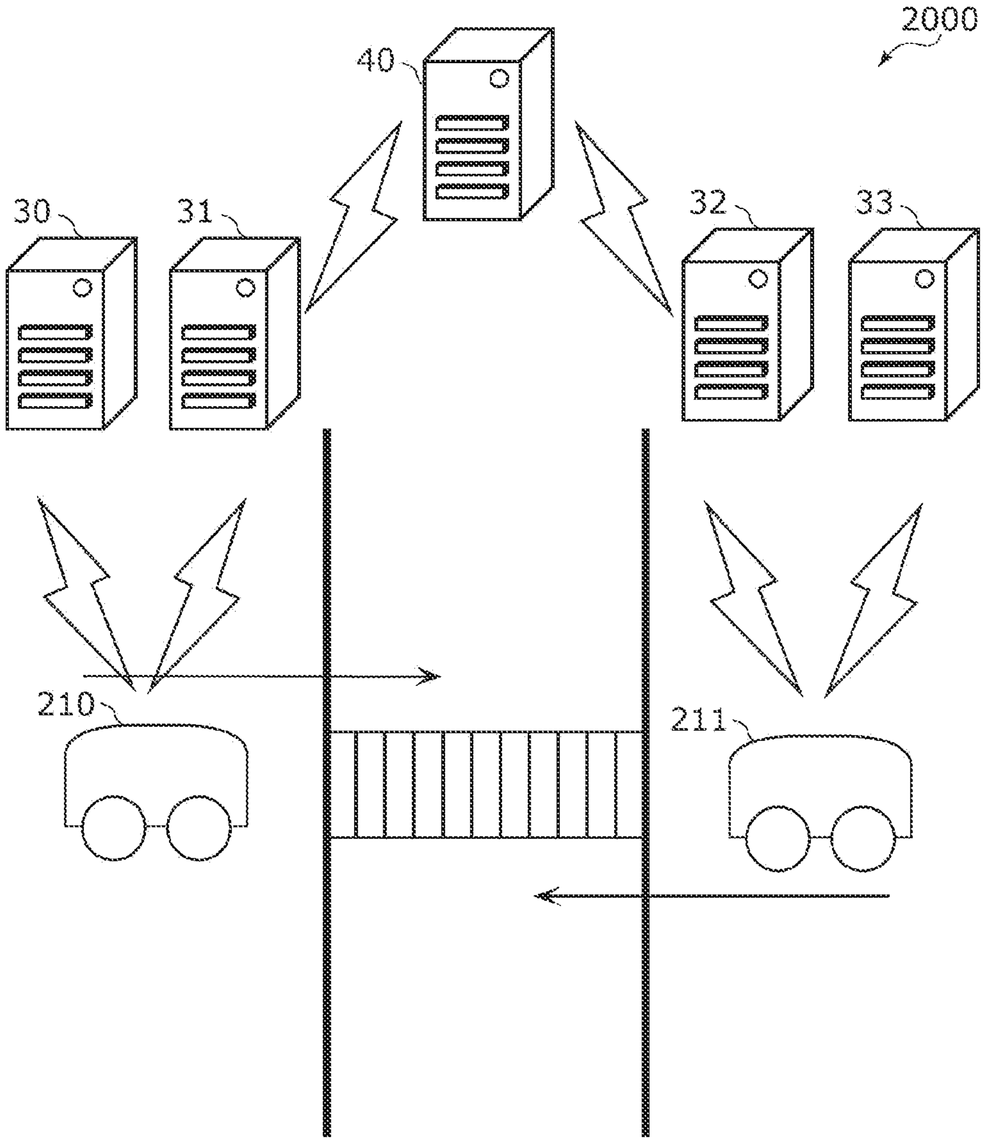
FIG. 13 is a diagram illustrating an example of the overall configuration of a transport system according to Embodiment 2.

First, the configuration of the transport system according to the present embodiment will be described with reference to FIGS. 13 to 16. FIG. 13 is a diagram illustrating an example of the overall configuration of transport system 2000 according to present embodiment. The arrows in FIG. 13 indicate the directions of travel of robots 210 and 211.

As illustrated in FIG. 13, transport system 2000 according to the present embodiment includes robots 210 and 211, service servers 30 to 33, and authentication station 40. Robots 210 and 211 are both autonomous mobile robots that travel autonomously. Robot 210 transports an object of robot 210 along a transport route, and robot 211 transports an object of robot 211 along a transport route. FIG. 13 illustrates a state in which robots 210 and 211 have approached the same crosswalk from the opposite direction in order to travel.

Service servers 30 to 33 are servers specialized to provide specific services (dedicated servers). Service servers 30 and 31 are communicably connected to robot 210 and communicate about services provided by robot 210. Service servers 32 and 33 are communicably connected to robot 211 and communicate about services provided by robot 211. The communication about the services includes transmitting a public key certificate to the robot based on the service provided by the robot, and transmitting information to the robot indicating which of the plurality of services to provide. Each of service servers 30 to 33 are an example of a "server".

Note that the number of robots that can communicate with each of service servers 30 to 33 is not limited to one, and may be more than one. Additionally, the number of robots that can communicate with one service server may be more than one.

Authentication station 40 is responsible for processing pertaining to the issuing and revoking of public key certificates, and has functions for authorizing the services provided by the robots and revoking issued public key certificates. Authentication station 40 communicates with each of service servers 30 to 33 pertaining to the issuing and revoking of public key certificates. Upon obtaining at least one of the service and purpose of the robot from any of service servers 30 to 33, authentication station 40 transmits a public key certificate based on the obtained information to that service server. In addition, when authorization to provide a service corresponding to the public key certificate held by robot 210 (an example of a "first digital certificate") is canceled, authentication station 40 revokes that public key certificate, and when authorization to provide a service corresponding to the public key certificate held by robot 211 (an example of a "second digital certificate") is canceled, authentication station 40 revokes that public key certificate.

For example, authentication station 40 may function as a server that centrally manages the services and purposes of each of the plurality of robots included in transport system 2000, including robots 210 and 211. For example, each of service servers 30 to 33 is a server of a different business operator, and authentication station 40 may have a function for centrally managing public key certificates issued to each business operator.

Figure 14:
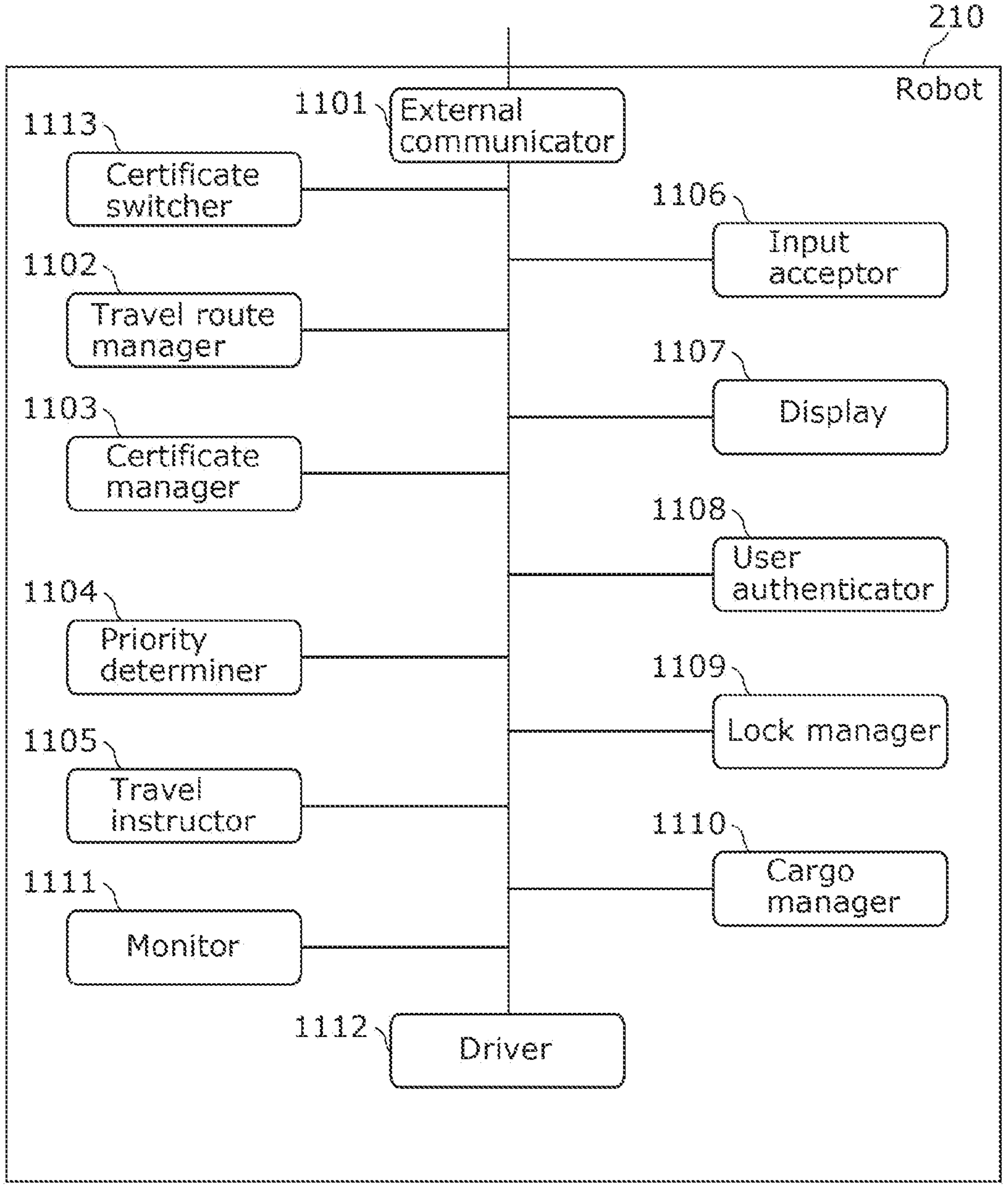
FIG. 14 is a block diagram illustrating an example of the functional configuration of a robot according to Embodiment 2.

The configurations of robots 210 and 211 will be described next with reference to FIG. 14. FIG. 14 is a block diagram illustrating an example of the functional configuration of robot 210 according to the present embodiment. The configuration of robot 211 may be the same as that of robot 210.

Robot 210 has the same configuration as that of robot 10 according to Embodiment 1, with the addition of certificate switcher 1113. Robot 210 holds a plurality of public key certificates based on the details of the service, purpose, or the like. Robot 210 holds two or more public key certificates including, for example, a public key certificate corresponding to a first service (an example of the "first digital certificate") and a public key certificate corresponding to a second service (an example of a "third digital certificate").

Based on instructions from service server 30 or 31, certificate switcher 1113 performs processing for switching to a public key certificate based on the details of the service currently being provided, from among the plurality of public key certificates. The priorities are determined using the public key certificate which has been switched to.

For example, certificate switcher 1113 may obtain, from service server 30 or 31, information indicating the public key certificate after the switch, and switch to the public key certificate identified based on the information, or may obtain information indicating the details of the service provided and switch to the public key certificate corresponding to the details of the service.

Figure 15:
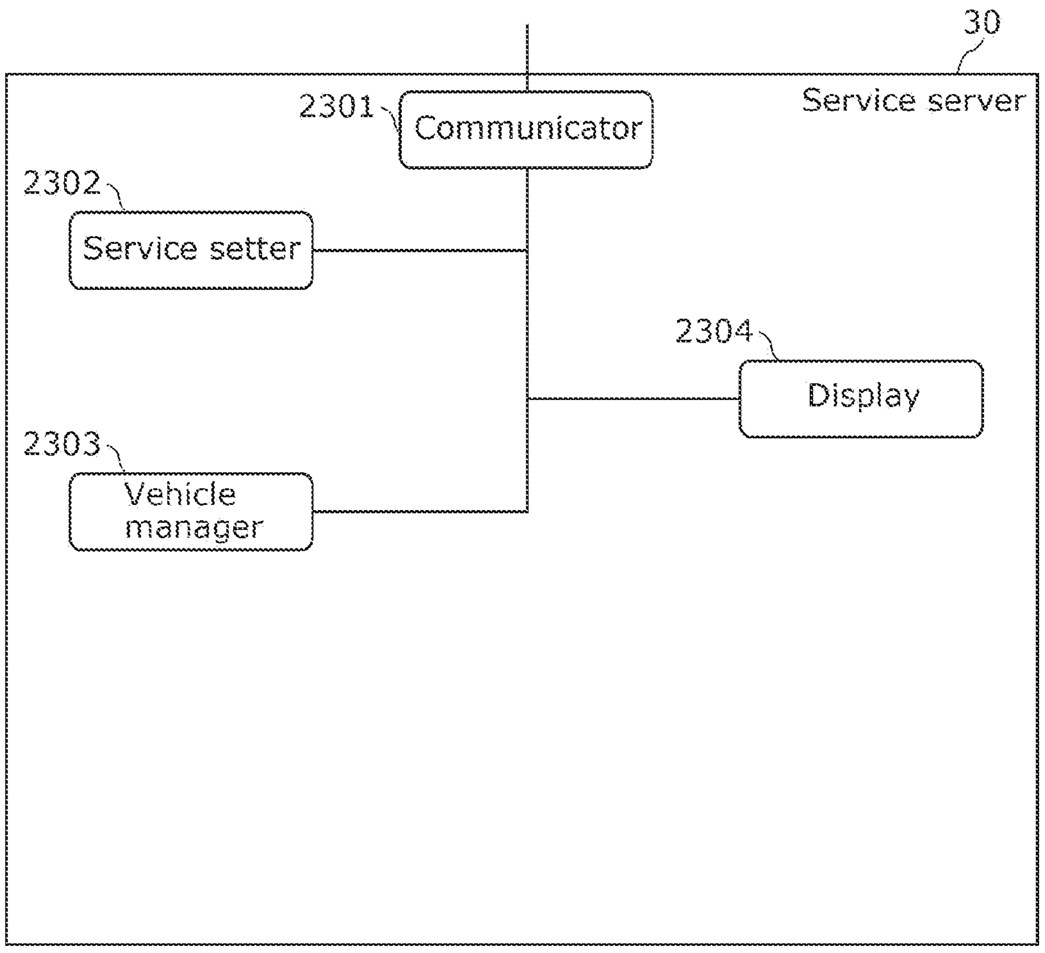
FIG. 15 is a block diagram illustrating an example of the functional configuration of a service server according to Embodiment 2.

The configurations of service servers 30 to 33 will be described next with reference to FIG. 15. FIG. 15 is a block diagram illustrating an example of the functional configuration of service server 30 according to the present embodiment. The configurations of service servers 31 to 33 may be the same as that of service server 30, and will therefore not be described.

As illustrated in FIG. 15, service server 30 includes communicator 2301, service setter 2302, vehicle manager 2303, and display 2304.

Communicator 2301 is communication circuitry (a communication module) for service server 30 to communicate with the exterior of service server 30. Service server 30 communicates with robot 210 and authentication station 40 through communicator 2301, for example.

Service setter 2302 sets information pertaining to the service to be provided for robot 210. The information pertaining to the service includes the details of the service, the transport route, the transport time, and the like.

Vehicle manager 2303 holds the information of the public key certificate to be held for each robot in order to select the robot according to the service provided. Vehicle manager 2303 is a storage device such as a semiconductor memory.

Display 2304 is a display, a light, or the like for displaying the status of the delivery of the service to a server administrator.

Figure 16:
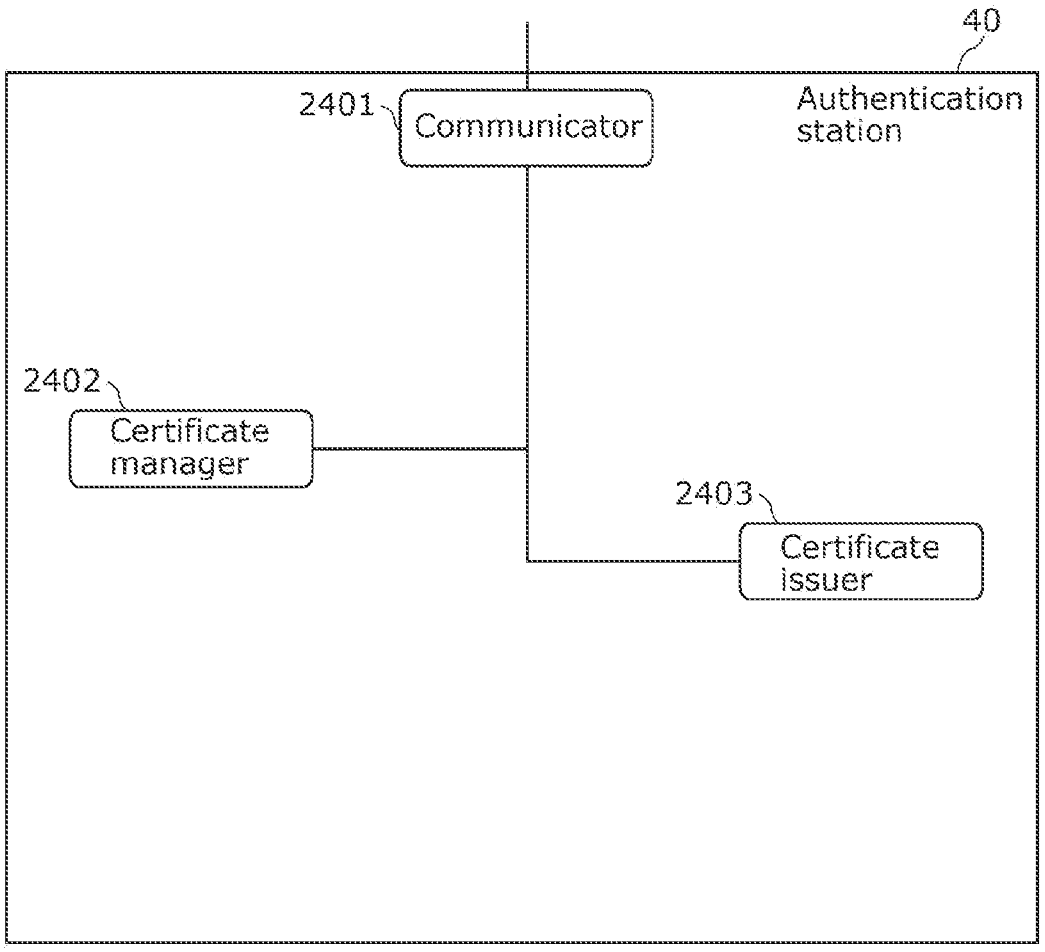
FIG. 16 is a block diagram illustrating an example of the functional configuration of an authentication station according to Embodiment 2.

The configuration of authentication station 40 will be described next with reference to FIG. 16. FIG. 16 is a block diagram illustrating an example of the functional configuration of authentication station 40 according to the present embodiment.

As illustrated in FIG. 16, authentication station 40 includes communicator 2401, certificate manager 2402, and certificate issuer 2403.

Communicator 2401 is communication circuitry (a communication module) for authentication station to 40 communicate with the exterior of authentication station 40. Authentication station 40 communicates with each of service servers 30 to 33 through communicator 2401, for example.

Certificate manager 2402 stores issued public key certificates. Certificate manager 2402 is a storage device such as a semiconductor memory.

Certificate issuer 2403 issues public key certificates based on the details of purposes made from each of service servers 30 to 33. Certificate issuer 2403 issues different public key certificates for each service and each purpose of robot 210. Specifically, certificate issuer 2403 issues public key certificates having different information for "vehicle purpose/service", indicated in FIG. 3, for each service and each purpose of robot 210.

Authentication station 40 may also include an acceptor that accepts operations for an administrator to authorize services and revoke issued public key certificates, for example. The acceptor is, for example, a touch panel, a button, a keyboard, or the like, but may be configured to accept operations through voice or the like.

2-2. Operations of Transport System

Figure 17:
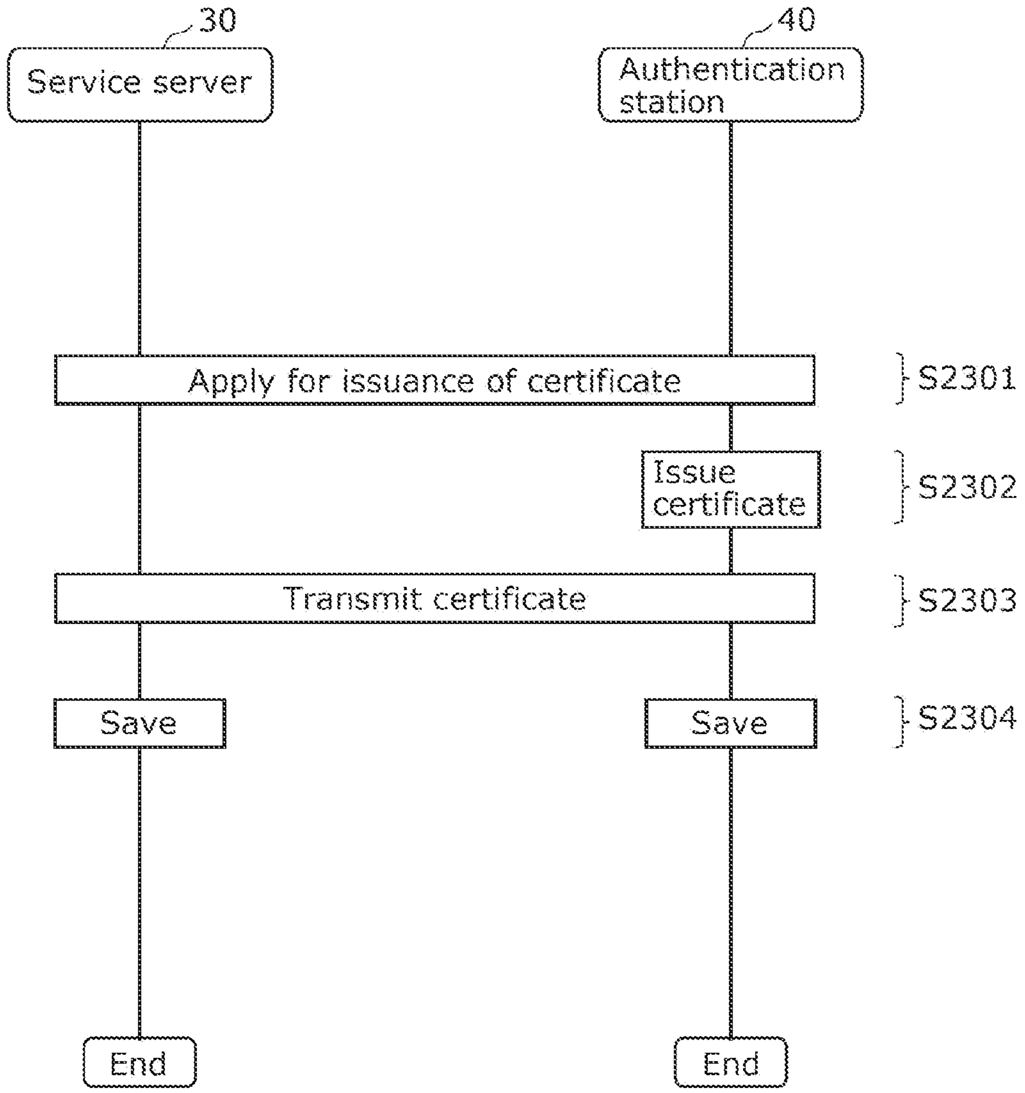
FIG. 17 is a sequence chart illustrating an example of operations for newly issuing a public key certificate according to Embodiment 2.
Figure 18:
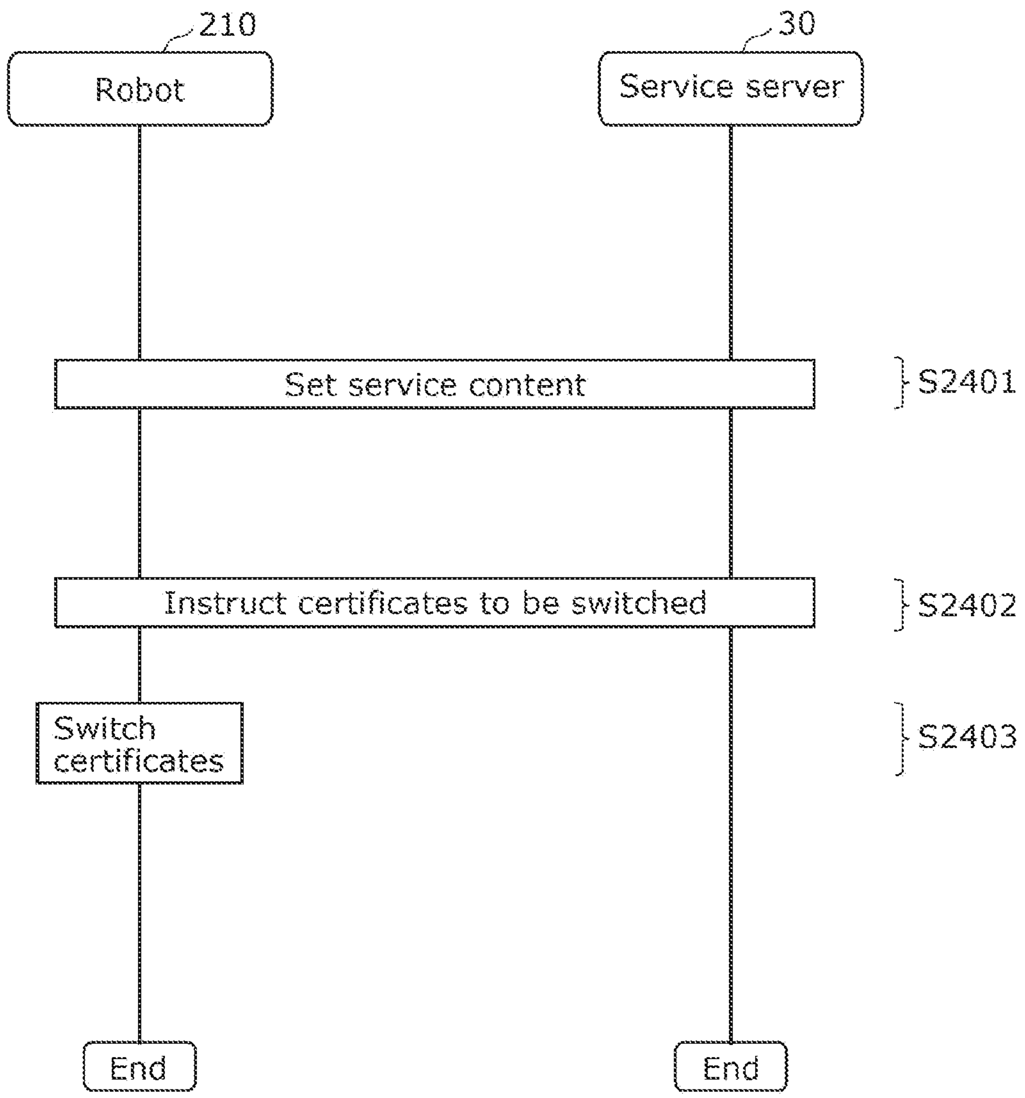
FIG. 18 is a sequence chart illustrating an example of operations for switching public key certificates for each of services provided, according to Embodiment 2.

Operations of transport system 2000 configured as described above will be described next with reference to FIGS. 17 and 18. First, processing performed by authentication station 40 to issue a public key certificate will be described with reference to FIG. 17. FIG. 17 is a sequence chart illustrating an example of operations for newly issuing a public key certificate (a travel determination method) according to the present embodiment. The following will describe a case where service server 30 has made a request for a public key certificate to be issued. Note that operations for issuing a public key certificate for each purpose are performed in the same manner.

(S2301) Service server 30 makes an application to authentication station 40 to issue a public key certificate based on the details of the service provided. Service server 30 transmits, to authentication station 40, information indicating the details of the service provided.

(S2302) If it is determined that the obtained details of the service are to be authorized, certificate issuer 2403 of authentication station 40 issues a corresponding public key certificate. Authentication station 40 issues a public key certificate that includes information indicating the details of the service provided, transmitted from service server 30 in step S2301.

(S2303) Certificate issuer 2403 of authentication station 40 transmits the issued public key certificate to service server 30 through communicator 2401.

(S2304) Both authentication station 40 and service server 30 store the public key certificate.

Then, when robot 210 has been authorized to provide the service, service server 30 transmits the public key certificate based on that service to robot 210.

Note that the operations illustrated in FIG. 17 may be executed before robot 210 starts being used, or may be executed after robot 210 starts being used.

Processing through which service servers 30 to 33 switch the public key certificates used by robots 210 and 211 will be described next with reference to FIG. 18. FIG. 18 is a sequence chart illustrating an example of operations for switching public key certificates (a travel determination method) for each of services provided, according to the present embodiment. The following will describe operations performed when service server 30 switches the public key certificate for robot 210. Note that it is assumed that service server 30 has transmitted, in advance to robot 210, a public key certificate for the details of each of the plurality of services that robot 210 can provide. In other words, robot 210 holds the same number of public key certificates as the number of details of services that can be provided.

(S2401) Service setter 2302 of service server 30 determines and sets the details of the service for robot 210. For example, service setter 2302 then determines the details of the service to be executed by robot 210, and sets information pertaining to the determined details of the service in robot 210. "Setting" means, for example, adding the details of the service, the transport route, the transport time, and the like determined into the schedule of robot 210.

(S2402) Service server 30 instructs robot 210 to switch the public key certificate, in order to use the public key certificate based on the service provided.

(S2403) Certificate switcher 1113 of robot 210 switches the public key certificate to be used from the current public key certificate to the public key certificate instructed by service server 30. Certificate switcher 1113 invalidates the public key certificate currently being used, reads out the public key certificate instructed by service server 30 from among the plurality of public key certificates held by certificate manager 1103, and validates the public key certificate that has been read out.

For example, in response to robot 210 switching from one of the first service or the second service to the other, the public key certificate used for the determination pertaining to travel may be switched from one of the first digital certificate or the third digital certificate to the other. Additionally, for example, the start of the delivery of the first service is a first timing at which the object is loaded onto robot 210, the end of the first service is a second timing at which the object is unloaded, and the switch from the first digital certificate to the third digital certificate may be performed at the first timing or the second timing.

This makes it possible for robot 210 to determine which of robot 210 and robot 211 is to travel with priority, using the public key certificate that is based on the details of the service being provided. Note that the public key certificate may be switched by at least one of robots 210 and 211.

Variation on Embodiment 2

Figure 19:
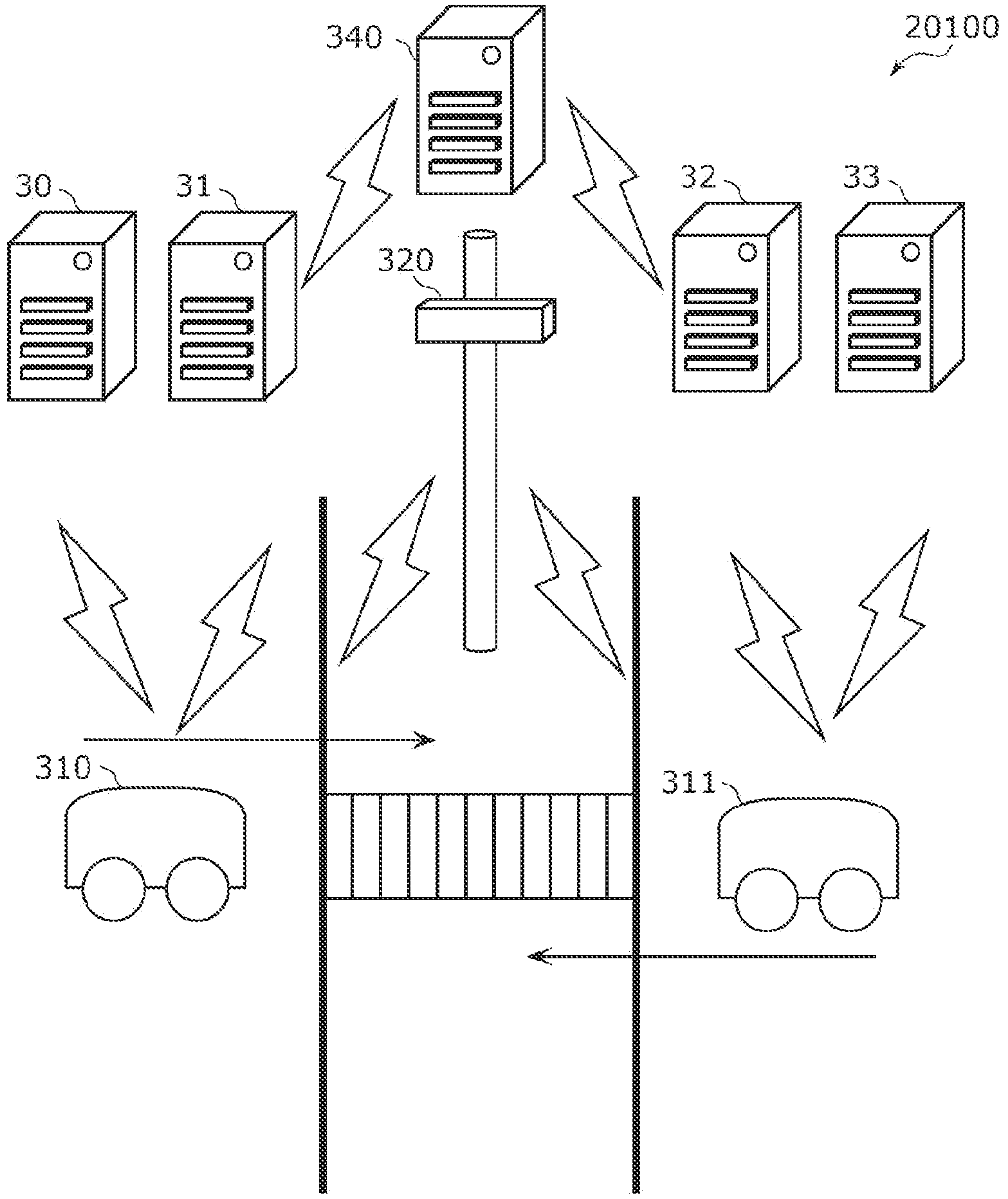
FIG. 19 is a diagram illustrating an example of the overall configuration of a transport system according to a variation on Embodiment 2.

A transport system according to the present variation will be described hereinafter with reference to FIGS. 19 to 24. The following descriptions will focus on the differences from Embodiment 2, and descriptions of configurations that are the same as or similar to those in Embodiment 2 will be omitted or simplified. FIG. 19 is a diagram illustrating an example of the overall configuration of transport system 20100 according to the present variation.

As illustrated in FIG. 19, transport system 20100 according to the present variation includes robots 310 and 311, roadside device 320, service servers 30 to 33, and authentication station 340. Transport system 20100 according to the present variation has the same configuration as transport system 2000 according to Embodiment 2, with the addition of roadside device 320. Additionally, transport system 20100 according to the present variation includes robots 310 and 311 instead of robots 210 and 211 of transport system 2000 according to Embodiment 2, and includes authentication station 340 instead of authentication station 40. Transport system 20100 according to the present variation has a configuration that combines transport system 10100 according to the variation on Embodiment 1 with transport system 2000 according to Embodiment 2. Additionally, transport system 20100 according to the present variation determines the validity of public key certificates issued by authentication station 340.

Figure 20:
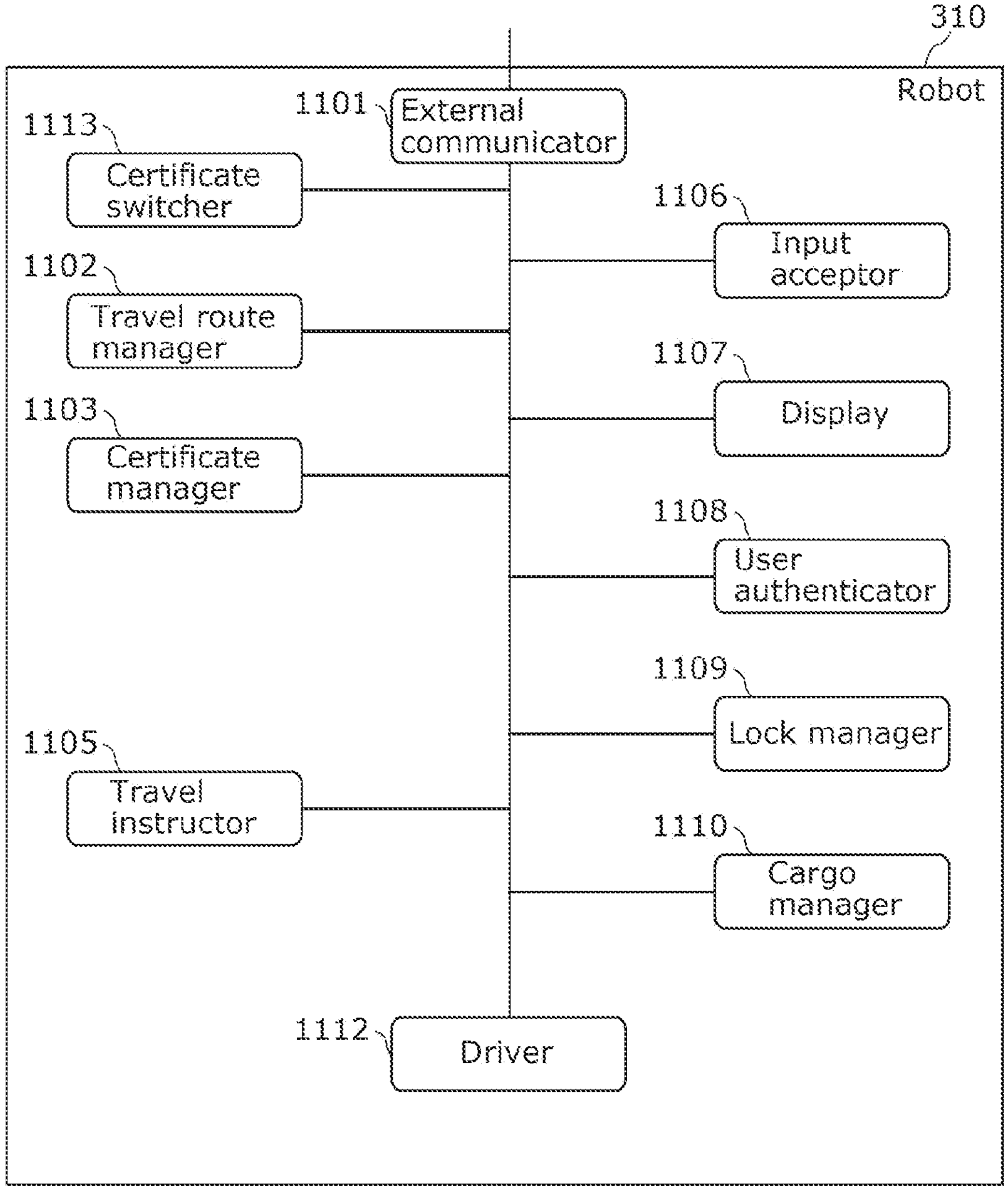
FIG. 20 is a block diagram illustrating an example of the functional configuration of a robot according to a variation on Embodiment 2.

FIG. 20 is a block diagram illustrating an example of the functional configuration of robot 310 according to the present variation. The configuration of robot 311 may be the same as that of robot 310.

As illustrated in FIG. 20, robot 310 has the same configuration as robot 210 according to Embodiment 2, but with priority determiner 1104 and monitor 1111 removed. External communicator 1101 is a communication module (communication circuitry) for robot 310 to communicate with service server 30, service server 31, and roadside device 320.

Figure 21:
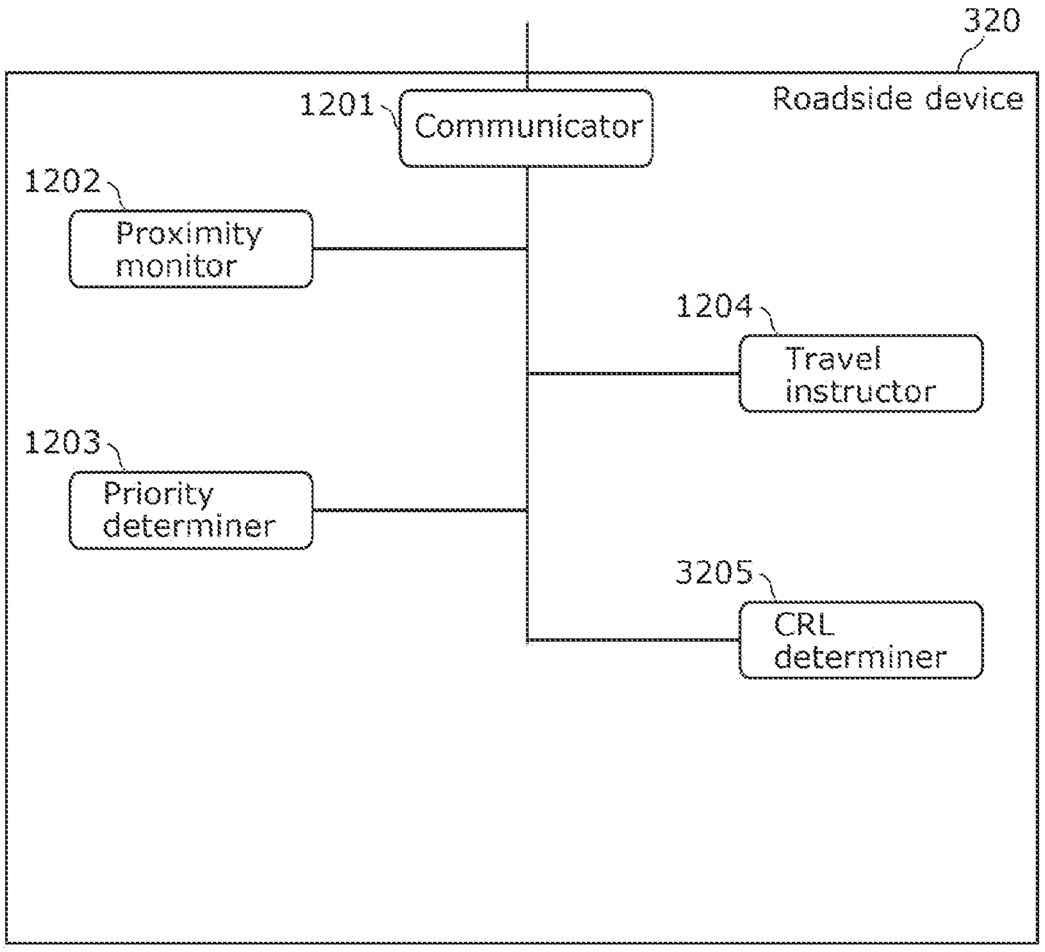
FIG. 21 is a block diagram illustrating an example of the functional configuration of a roadside device according to a variation on Embodiment 2.

FIG. 21 is a block diagram illustrating an example of the functional configuration of roadside device 320 according to the present variation.

As illustrated in FIG. 21, roadside device 320 has the same configuration as that of roadside device 120 according to the variation on Embodiment 1, with the addition of CRL determiner 3205. CRL determiner 3205 manages a CRL issued by authentication station 340, and determines the validity of public key certificates obtained from robots 310 and 311 based on the CRL. The CRL is a list containing revocation information (a serial number and a revocation date) of the public key certificates. A public key certificate is revoked when authorization to provide the service is canceled. A revoked public key certificate is added to the CRL.

Figure 22:
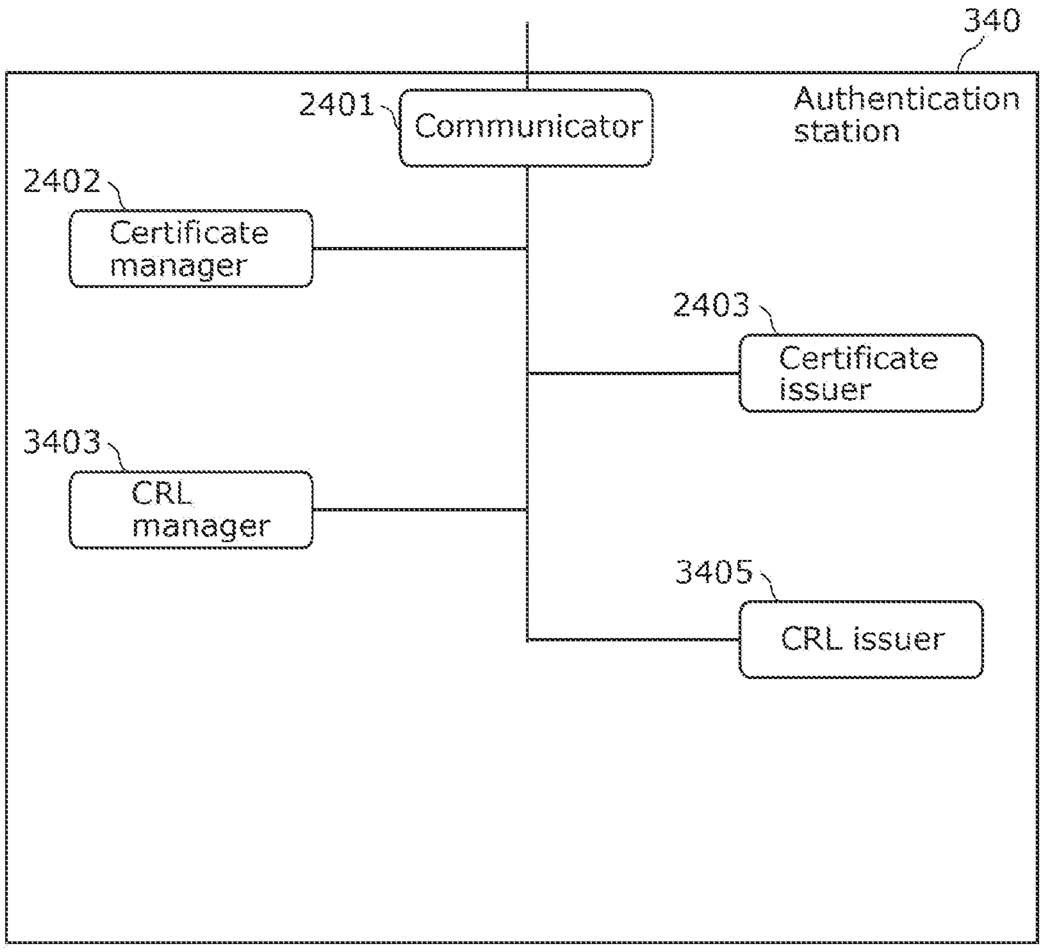
FIG. 22 is a block diagram illustrating an example of the functional configuration of an authentication station according to a variation on Embodiment 2.

FIG. 22 is a block diagram illustrating an example of the functional configuration of authentication station 340 according to the present variation.

As illustrated in FIG. 22, authentication station 340 has the same configuration as that of authentication station 40 according to Embodiment 2, with the addition of CRL manager 3403 and CRL issuer 3405.

CRL manager 3403 stores issued CRLs. CRL manager 3403 is a storage device such as a semiconductor memory, for example.

CRL issuer 3405 creates CRLs from expired public key certificates, leaked information, and the like. CRL issuer 3405 transmits the created CRLs to roadside device 320. CRL issuer 3405 transmits a CRL to roadside device 320 every predetermined interval of time or whenever the CRL is updated.

Figure 23:
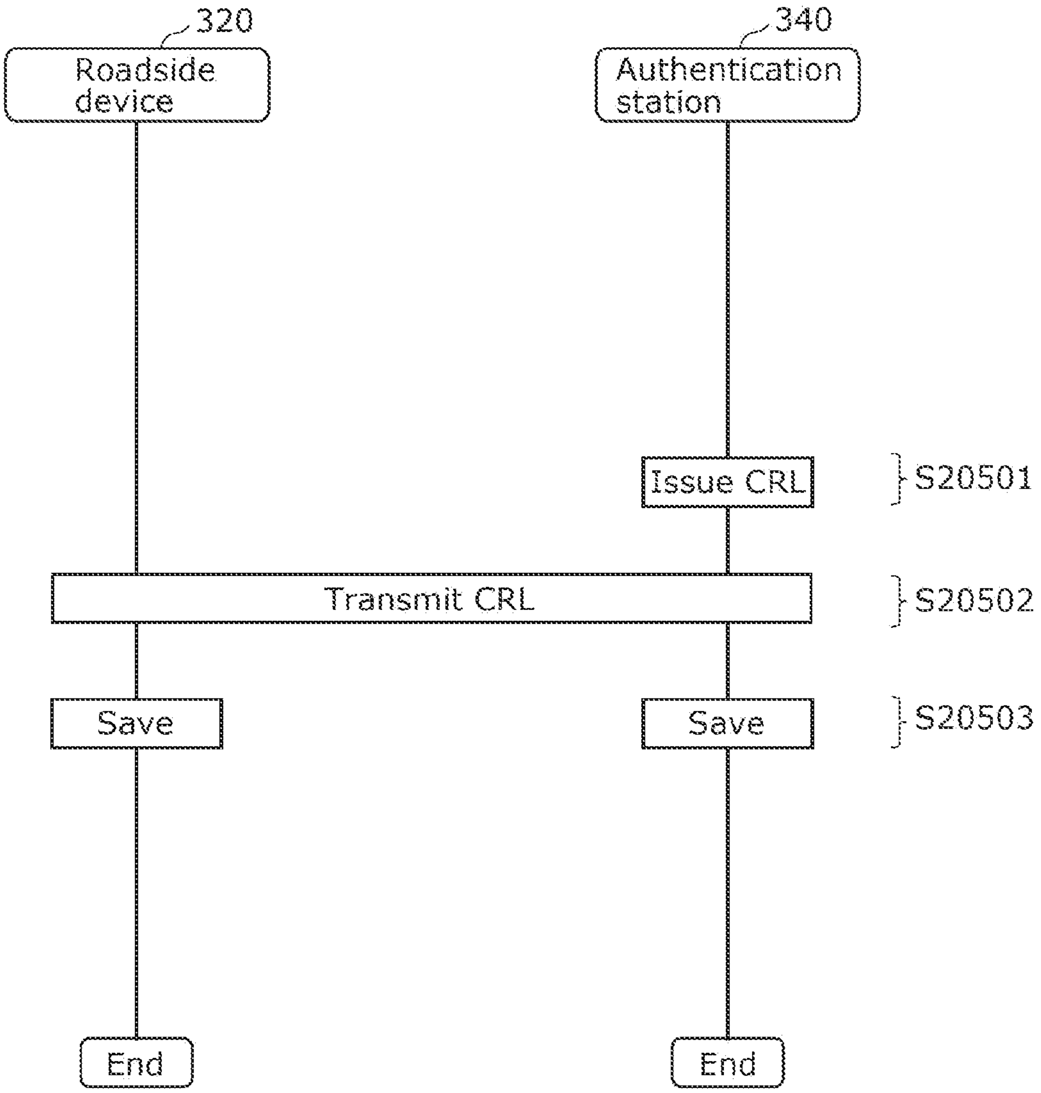
FIG. 23 is a sequence chart illustrating an example of operations for issuing a CRL for managing revocation of an issued public key certificate according to a variation on Embodiment 2.

Operations of transport system 20100 configured as described above will be described next with reference to FIGS. 23 and 24. FIG. 23 is a sequence chart illustrating an example of operations for issuing a CRL for managing the revocation of an issued public key certificate according to the present variation.

(S20501) CRL issuer 3405 of authentication station 340 issues a CRL when a public key certificate has expired, information is leaking, and the like.

(S20502) CRL issuer 3405 of authentication station 340 transmits the CRL to roadside device 320 through communicator 2401.

(S20503) Authentication station 340 and roadside device 320 store the CRL. Authentication station 340 stores the CRL issued in step S20501 in CRL manager 3403. Additionally, roadside device 320 stores the CRL obtained from authentication station 340 in storage (not shown). Roadside device 320 stores the newly-obtained CRL in place of the CRL stored in the storage.

Figure 24:
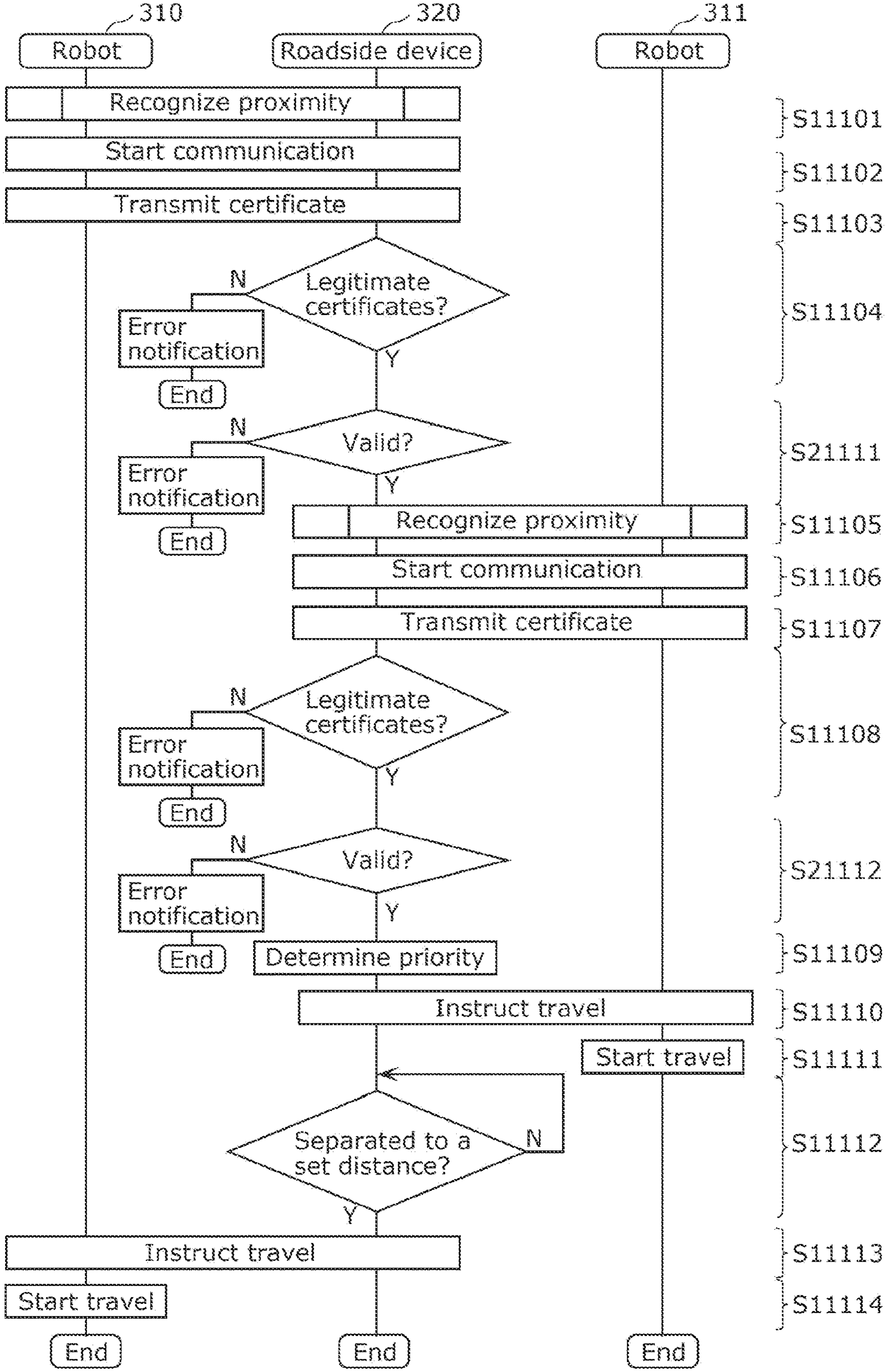
FIG. 24 is a sequence chart illustrating an example of operations performed by the transport system according to a variation on Embodiment 2.

FIG. 24 is a sequence chart illustrating an example of operations of the transport system (a travel determination method) according to the present variation. In FIG. 24, processing that is the same as in FIG. 11 in the variation on Embodiment 1 will be given the same reference signs, and will not be described.

(S21111) After step S11104, CRL determiner 3205 of roadside device 320 determines whether the public key certificate for which a determination of "Yes" was made in step S11104 is valid using the CRL (a CRL check). If the obtained public key certificate is included in the CRL, CRL determiner 3205 determines that the public key certificate is invalid, whereas if the obtained public key certificate is not included in the CRL, CRL determiner 3205 determines that the public key certificate is valid.

If CRL determiner 3205 determines that the public key certificate is invalid ("N" in S21111 of FIG. 24), an error notification is made and the processing is ended. On the other hand, if the public key certificate is determined to be valid ("Y" in S21111 of FIG. 24), CRL determiner 3205 determines that the public key certificate can be used to determine the priorities of robots 310 and 311.

(S21112) After step S11108, CRL determiner 3205 of roadside device 320 determines whether the public key certificate for which a determination of "Yes" was made in step S11108 is valid using the CRL (a CRL check). If CRL determiner 3205 determines that the public key certificate is invalid ("N" in S21112 of FIG. 24), an error notification is made and the processing is ended. On the other hand, if the public key certificate is determined to be valid ("Y" in S21112 of FIG. 24), CRL determiner 3205 determines that the public key certificate can be used to determine the priorities of robots 310 and 311.

Note that step S21111 may be executed before step S11104, and step S21112 may be executed before step S11108.

This makes it possible to suppress situations where the priority cannot be determined accurately due to the use of an improper public key certificate, e.g., for which the validity period has passed, there is a risk of information being leaked, or the like.

Example of Displaying Result of Priority Determination

Figure 25:
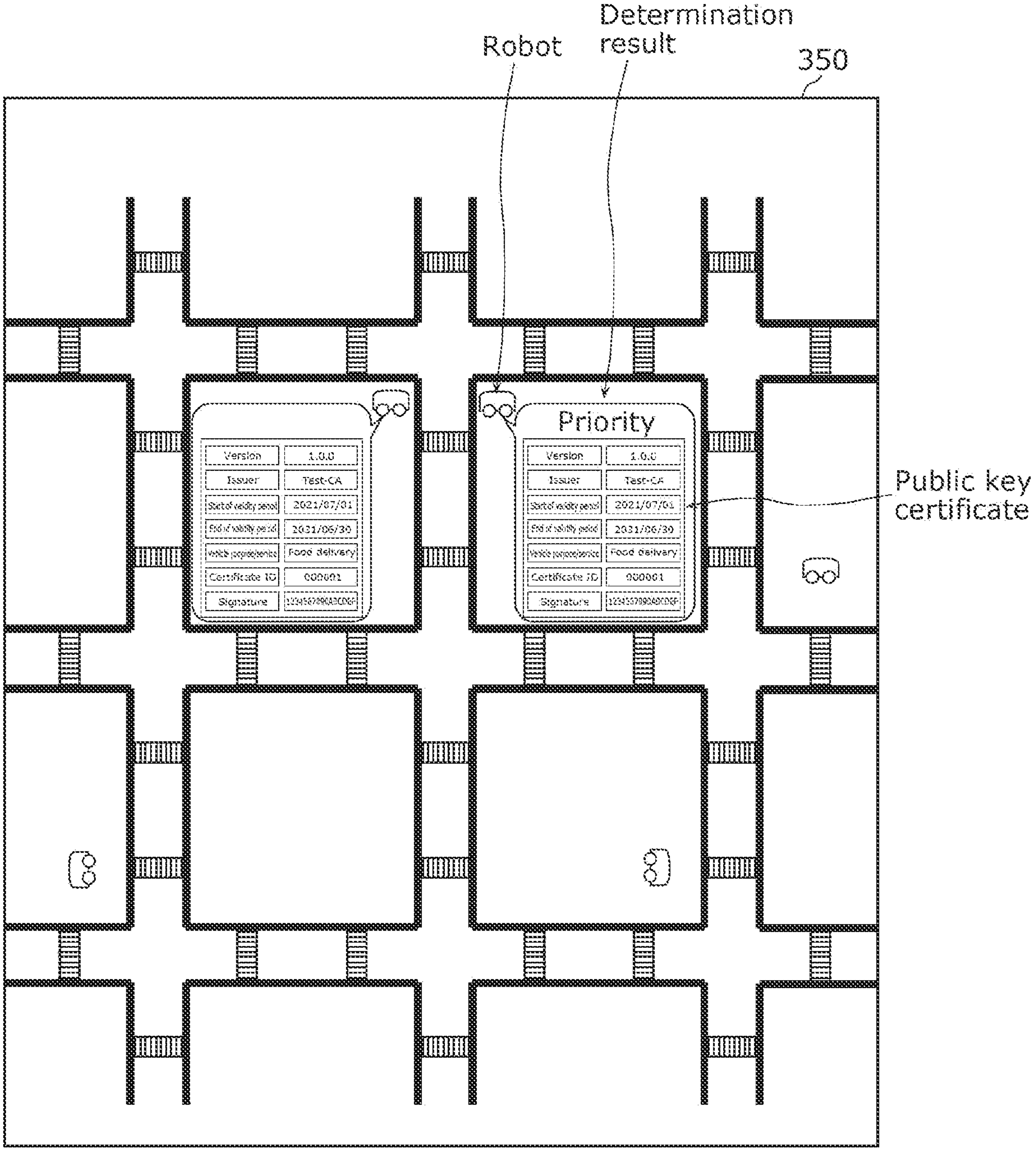
FIG. 25 is a diagram illustrating an example of a user interface screen.

An example of the display of the result of the priority determination in the above-described embodiments and the like will be described next with reference to FIG. 25. FIG. 25 is a diagram illustrating an example of a user interface screen. FIG. 25 illustrates a screen displayed in display device 350 connected to each of service servers 30 to 33. The transport system may include display device 350 that displays a determination result from priority determiner 1203 on a screen. Display device 350 may be implemented by display 2304 included in service server 30, illustrated in FIG. 15.

As illustrated in FIG. 25, the user interface screen of display device 350 displays the position of each robot, the priority determination result, and the information used to determine the priority (e.g., the public key certificates held by the robots). The user interface screen illustrated in FIG. 25 is displayed based on an operation made by the server administrator, or automatically, and the server administrator can confirm the content thereof. In addition to the above, the display content may include information necessary for the robot to travel, such as travel speed, acceleration, the travel state of the robot (traveling, idling, stopped, and the like), the robot's exterior dimensions, obstacles or pedestrians around the robot, the presence or absence of automobiles, and the like. For example, an error notification when a determination of "No" is made in step S1104 or the like of FIG. 5 may also be displayed in the user interface screen. The server administrator is an example of a monitoring party that remotely monitors the transport system.

Note that the priority determination result and the information used to determine the priority may be displayed when a predetermined operation is performed by the server administrator (e.g., clicking the robot on the screen), or may be displayed at all times.

OTHER EMBODIMENTS

A travel determination method and the like according to one or more aspects have been described thus far based on embodiments and the like, but the present disclosure is not limited to the embodiments and the like. Variations on the present embodiment conceived by one skilled in the art, embodiments implemented by combining constituent elements from different other embodiments, and the like may be included as well in the present disclosure as long as they do not depart from the essential spirit of the present disclosure.

For example, in the foregoing embodiments and the like, the robot to be included in the transport system may be any type of robot. For example, the robot may be a self-driving vehicle, a ship system, or a mobility robot such as a drone, or may be a robot that performs specific services (tasks), such as an industrial robot or a humanoid robot.

The public key certificate in the foregoing embodiments and the like may be a digital certificate according to any standard as long as the digital certificate contains the information of the "vehicle purpose/service" illustrated in FIG. 4. Additionally, although an example in which the public key certificate includes information of the "vehicle purpose/service" has been described in the foregoing embodiments and the like, the information of the "priority" may be included instead of the information of the "vehicle purpose/service". For example, the public key certificate may include information indicating a priority (e.g., priorities "S" to "B"). In this case, the priority need not be determined, and which robot is to travel with priority may be determined by comparing the "priorities" included in the public key certificates.

Additionally, although the foregoing embodiments and the like described an example of determining which robot is to travel with priority when two robots meet, the travel determination method of the present disclosure can be applied even when three or more robots meet.

Additionally, although the foregoing embodiments and the like described determining which robot is to travel with priority based on public key certificates, the determination may further be made using the states of transport of the object in the robot. The status of the transport includes whether the transport of the object is finished, for example. For example, if a first robot, which has a priority of "S" and has finished transporting an object, and a second robot, which has a priority of "A" and is currently transporting an object, meet, a determination may be made to have the second robot travel with priority over the first robot.

Additionally, although the foregoing embodiments and the like described an example in which the robots included in the transport system are applied to robots traveling outdoors, the robots may be applied in robots that travel indoors. Such robots include serving robots, cleaning robots, and the like, for example, but are not limited thereto.

Additionally, in the priority determination according to the foregoing embodiments and the like, if the priority of the two robots is the same, a monitoring party who remotely monitors the two robots may be notified, or the determination as to which robot is to be given priority may be made based on a rule set in advance.

The transport route according to the foregoing embodiments and the like includes a route over which the object is actually being transported, as well as a route in which the robot travels in order to receive the object. In other words, the transport route includes a route in which the object is not actually being transported.

The robots included in the transport system according to the foregoing embodiments and the like may be a dedicated vehicle for at least one of an object and a service, or may be a general-purpose vehicle.

Additionally, in the foregoing embodiments and the like, the constituent elements are constituted by dedicated hardware. However, the constituent elements may be realized by executing software programs corresponding to those constituent elements. Each constituent element may be realized by a program executing unit such as a CPU or a processor reading out and executing a software program recorded into a recording medium such as a hard disk or semiconductor memory.

The orders in which the steps in the flowcharts are performed are for describing the present disclosure in detail, and other orders may be used instead. Some of the above-described steps may be executed simultaneously (in parallel) with other steps, and some of the above-described steps may not be executed.

Additionally, the divisions of the function blocks in the block diagrams are merely examples, and a plurality of function blocks may be realized as a single function block, a single function block may be divided into a plurality of function blocks, or some functions may be transferred to other function blocks. Additionally, the functions of a plurality of function blocks having similar functions may be processed by a single instance of hardware or software, in parallel or time-divided.

Additionally, each of the constituent elements of the transport system according to the foregoing embodiments and the like may be realized as a single device, or as a plurality of devices.

Each of the constituent elements described in the foregoing embodiment and the like may be realized as software, or typically as an LSI circuit, which is an integrated circuit. These devices can be implemented individually as single chips, or may be implemented with a single chip including some or all of the devices. Although the term "LSI" is used here, other names, such as IC, system LSI, super LSI, ultra LSI, and so on are used depending on the degree of integration. Further, the manner in which the circuit integration is achieved is not limited to LSI, and it is also possible to use a dedicated circuit (a generic circuit that executes a dedicated program) or a general purpose processor. It is also possible to employ a FPGA (Field Programmable Gate Array) which is programmable after the LSI circuit has been manufactured, or a reconfigurable processor in which the connections or settings of the circuit cells within the LSI circuit can be reconfigured. Furthermore, if other technologies that improve upon or are derived from semiconductor technology enable integration technology to replace LSI circuits, then naturally it is also possible to integrate the constituent elements using that technology.

"System LSI" refers to very-large-scale integration in which multiple processing units are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

For example, one aspect of the present disclosure may be a computer program that causes a computer to execute each of the characteristics steps included in a travel determination method illustrated in any one of FIGS. 5, 6, 11, 12, 17, 18, 23, and 24.

Additionally, for example, the program may be a program to be executed by a computer. Furthermore, aspects of the present disclosure may be realized as a computer-readable non-transitory recording medium in which such a program is recorded. For example, such a program may be recorded in the recording medium and distributed or disseminated. For example, by installing a distributed program in a device having another processor and causing the processor to execute the program, the device can perform each of the processes described above.

Supplementary Notes

The following techniques are disclosed by the descriptions in the foregoing embodiments.

Technique 1

A travel determination method of making a determination pertaining to travel of a first vehicle and a second vehicle each transporting an object to a set location, the first vehicle being an unmanned ground vehicle, and holding a first digital certificate according to at least one of a vehicle purpose of the first vehicle or a service of the first vehicle, the second vehicle holding a second digital certificate according to at least one of a vehicle purpose of the second vehicle or a service of the second vehicle, the travel determination method including:

obtaining the first digital certificate and the second digital certificate; and first determining of determining whether to prioritize travel of the first vehicle or the second vehicle, based on the first digital certificate and the second digital certificate obtained, when each of the first vehicle and the second vehicle travels on a corresponding transport route.

Technique 2

The travel determination method according to Technique 1, wherein the first determining includes determining whether to prioritize travel of the first vehicle or the second vehicle on the overlapping part, based on the first digital certificate and the second digital certificate, when the transport route of the first vehicle and the transport route of the second vehicle have an overlapping part.

Technique 3

The travel determination method according to Technique 2, wherein the first determining includes:

determining a first priority with which the first vehicle is to travel on the overlapping part based on the first digital certificate;

determining a second priority with which the second vehicle is to travel on the overlapping part, based on the second digital certificate; and determining whether to prioritize travel of the first vehicle or the second vehicle based on the first priority and the second priority determined.

Technique 4

The travel determination method according to Technique 2 or 3, further including:

second determining of determining whether the first vehicle and the second vehicle are near each other in a periphery of the overlapping part, wherein the obtaining and the first determining are executed when the first vehicle and the second vehicle are determined to be near each other in the second determining.

Technique 5

The travel determination method according to any one of Techniques 1 to 4, wherein the first digital certificate is issued for each of types of the vehicle purpose of the first vehicle, and the second digital certificate is issued for each of types of the vehicle purpose of the second vehicle.

Technique 6

The travel determination method according to Technique 5, wherein the types of the vehicle purpose include an emergency vehicle.

Technique 7

The travel determination method according to any one of Techniques 1 to 6, wherein the first digital certificate is issued for each of types of the service provided by the first vehicle, and the second digital certificate is issued for each of types of the service provided by the second vehicle.

Technique 8

The travel determination method according to Technique 7, wherein the types of the service include a service that has a validity period.

Technique 9

The travel determination method according to Technique 7, wherein the validity period of the service is a validity period based on a delivery time of the service.

Technique 10

The travel determination method according to Technique 9, wherein the object includes a food and/or beverage product, and the delivery time is a time based on a permissible delivery time of the food and/or beverage product.

Technique 11

The travel determination method according to any one of Techniques 1 to 10, wherein the first digital certificate is issued when the first vehicle is manufactured and is held in advance in the first vehicle.

Technique 12

The travel determination method according to any one of Techniques 1 to 11, wherein the first digital certificate according to the first service is transmitted to the first vehicle from a server to which the first vehicle can communicably connect when the first vehicle is authorized to provide a first service.

Technique 13

The travel determination method according to any one of Techniques 1 to 12, wherein the first digital certificate is revoked when authorization to provide a service corresponding to the first digital certificate is canceled, and the second digital certificate is revoked when authorization to provide a service corresponding to the second digital certificate is canceled.

Technique 14

The travel determination method according to any one of Techniques 1 to 13, wherein the first vehicle holds two or more digital certificates including the first digital certificate corresponding to the first service and a third digital certificate corresponding to a second service, the travel determination method further including:

switching a digital certificate used in the first determining from one of the first digital certificate or the third digital certificate to the other in response to switching from one of the first service and the second service to the other.

Technique 15

The travel determination method according to Technique 14, wherein a start of delivery of the first service is a first timing at which the object is placed in the first vehicle, an end of the first service is a second timing at which the object is unloaded from the first vehicle, and the switching includes:

switching from one of the first digital certificate and the third digital certificate to the other at the first timing or the second timing.

Technique 16

The travel determination method according to any one of Techniques 1 to 15, slowing down or temporarily stopping the first vehicle, when it is determined to prioritize travel of the second vehicle as a result of the first determining.

Technique 17

The travel determination method according to any one of Techniques 1 to 15, wherein the first determining is executed by an external device outside the first vehicle and the second vehicle, and the first vehicle receives an instruction to slow down or temporarily stop from the external device, when it is determined to prioritize travel of the second vehicle priority as a result of the first determining.

Technique 18

The travel determination method according to any one of Techniques 1 to 17, further including:

presenting a result of the first determining to a monitoring party that remotely monitors a transport system including the first vehicle and the second vehicle.

Technique 19

A travel determination system that makes a determination pertaining to travel of a first vehicle and a second vehicle each transporting an object to a set location, the first vehicle being an unmanned ground vehicle, and holding a first digital certificate according to at least one of a vehicle purpose of the first vehicle or a service of the first vehicle, the second vehicle holding a second digital certificate according to at least one of a vehicle purpose of the second vehicle or a service of the second vehicle, the travel determination system including:

an obtainer that obtains the first digital certificate and the second digital certificate; and a determiner that determines whether to prioritize travel of the first vehicle or the second vehicle, based on the first digital certificate and the second digital certificate obtained, when each of the first vehicle and the second vehicle travels on a corresponding transport route.

Technique 20

The travel determination system according to Technique 19, further including:

a display that displays a determination result in the determiner on a screen.

INDUSTRIAL APPLICABILITY

The present disclosure is useful in a transport system or the like in which vehicles capable of traveling autonomously transport objects.

The invention claimed is:

1. A travel determination method, as implemented by a processor, the travel determination method comprising:

making a determination pertaining to travel of a first vehicle and a second vehicle each transporting an object to a set location, the first vehicle being an unmanned ground vehicle and holding a first digital certificate according to at least one of a vehicle purpose of the first vehicle or a service of the first vehicle, the second vehicle holding a second digital certificate according to at least one of a vehicle purpose of the second vehicle or a service of the second vehicle;

obtaining the first digital certificate and the second digital certificate; and performing a first determining that prioritizes travel of either the first vehicle or the second vehicle based on the first digital certificate and the second digital certificate obtained, when each of the first vehicle and the second vehicle travels on a corresponding transport route, wherein the first determining is performed when the first vehicle and the second vehicle meet at an overlapping part between the transport route of the first vehicle and the transport route of the second vehicle, based on a type of the vehicle purpose of the first vehicle and a type of the service provided by the first vehicle.

2. The travel determination method according to claim 1, wherein the first determining includes determining whether to prioritize the travel of the first vehicle or the second vehicle based on the overlapping part of the corresponding transport route as traveled by the first vehicle and the transport route of the second vehicle.

3. The travel determination method according to claim 2, wherein the first determining includes:

determining a first priority with which the first vehicle is to travel on the overlapping part based on the first digital certificate;

determining a second priority with which the second vehicle is to travel on the overlapping part, based on the second digital certificate; and determining whether to prioritize travel of the first vehicle or the second vehicle based on the determining of the first priority and the second priority.

4. The travel determination method according to claim 2, further comprising:

performing a second determining that determines whether the first vehicle and the second vehicle are near each other in a periphery of the overlapping part, wherein the obtaining and the first determining are executed when the first vehicle and the second vehicle are determined to be near each other in the second determining.

5. The travel determination method according to claim 1, wherein the first digital certificate is issued for each of types of the vehicle purpose of the first vehicle, and wherein the second digital certificate is issued for each of types of the vehicle purpose of the second vehicle.

6. The travel determination method according to claim 5, wherein the types of the vehicle purpose include an emergency vehicle.

7. The travel determination method according to claim 1, wherein the first digital certificate is issued for each of types of the service provided by the first vehicle, and wherein the second digital certificate is issued for each of types of the service provided by the second vehicle.

8. The travel determination method according to claim 7, wherein the types of the service include a service that has a validity period.

9. The travel determination method according to claim 7, wherein the validity period of the service is a validity period based on a delivery time of the service.

10. The travel determination method according to claim 9, wherein the object includes a food and/or beverage product, and wherein the delivery time is a time based on a permissible delivery time of the food and/or beverage product.

11. The travel determination method according to claim 1, wherein the first digital certificate is issued when the first vehicle is manufactured and is held in advance in the first vehicle.

12. The travel determination method according to claim 1, wherein the first digital certificate according to the first service is transmitted to the first vehicle from a server to which the first vehicle can communicably connect when the first vehicle is authorized to provide a first service.

13. The travel determination method according to claim 1, wherein the first digital certificate is revoked when authorization to provide a service corresponding to the first digital certificate is canceled, and wherein the second digital certificate is revoked when authorization to provide a service corresponding to the second digital certificate is canceled.

14. The travel determination method according to claim 1, wherein the first vehicle holds two or more digital certificates including the first digital certificate corresponding to the first service and a third digital certificate corresponding to a second service; and wherein the travel determination method further comprises:

switching a digital certificate used in the first determining from one of the first digital certificate or the third digital certificate to the other in response to switching from one of the first service and the second service to the other.

15. The travel determination method according to claim 14, wherein:

a start of delivery of the first service is a first timing at which the object is placed in the first vehicle, an end of the first service is a second timing at which the object is unloaded from the first vehicle, and the switching includes switching from one of the first digital certificate and the third digital certificate to the other at the first timing or the second timing.

16. The travel determination method according to claim 1, further comprising:

slowing down or temporarily stopping the first vehicle, when it is determined to prioritize travel of the second vehicle as a result of the first determining.

17. The travel determination method according to claim 1, wherein the first determining is executed by an external device outside the first vehicle and the second vehicle, and wherein the first vehicle receives an instruction to slow down or temporarily stop from the external device, when it is determined to prioritize travel of the second vehicle priority as a result of the first determining.

18. The travel determination method according to claim 1, further comprising:

presenting a result of the first determining to a monitoring party that remotely monitors a transport system including the first vehicle and the second vehicle.

19. A travel determination system, as implemented by a processor, the travel determination system being executed to perform travel operations comprising:

making a determination pertaining to travel of a first vehicle and a second vehicle each transporting an object to a set location, the first vehicle being an unmanned ground vehicle and holding a first digital certificate according to at least one of a vehicle purpose of the first vehicle or a service of the first vehicle, the second vehicle holding a second digital certificate according to at least one of a vehicle purpose of the second vehicle or a service of the second vehicle;

obtaining the first digital certificate and the second digital certificate; and performing a first determining that prioritizes travel of either the first vehicle or the second vehicle based on the first digital certificate and the second digital certificate obtained, when each of the first vehicle and the second vehicle travels on a corresponding transport route, wherein the first determining is performed when the first vehicle and the second vehicle meet at an overlapping part between the transport route of the first vehicle and the transport route of the second vehicle, based on a type of the vehicle purpose of the first vehicle and a type of the service provided by the first vehicle.

20. The travel determination system according to claim 19, further comprising:

a display that displays a determination result on a screen.

* * * * *